(12) United States Patent
Suzuki et al.

(10) Patent No.: US 7,665,084 B2
(45) Date of Patent: Feb. 16, 2010

(54) UNINSTALL SYSTEM

(75) Inventors: Tomohiro Suzuki, Nagoya (JP); Hiromi Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1026 days.

(21) Appl. No.: 10/808,338

(22) Filed: Mar. 25, 2004

(65) Prior Publication Data

US 2004/0250265 A1    Dec. 9, 2004

(30) Foreign Application Priority Data

Mar. 25, 2003    (JP)    ............................ P2003-082880

(51) Int. Cl.
    *G06F 9/45*    (2006.01)
(52) U.S. Cl. .................................... 717/174
(58) Field of Classification Search ................. 717/174
    See application file for complete search history.

(56) References Cited

U.S. PATENT DOCUMENTS

| | | | |
|---|---|---|---|
| 6,020,971 | A | 2/2000 | Kato et al. |
| 6,049,663 | A | 4/2000 | Harikrishnan et al. |
| 6,216,176 | B1 | 4/2001 | Kadota |
| 6,216,196 | B1 | 4/2001 | Elwell et al. |
| 6,226,096 | B1 | 5/2001 | Ouchi |
| 6,668,289 | B2 * | 12/2003 | Cheng et al. ................. 710/36 |
| 2003/0225933 | A1 * | 12/2003 | Suzuki ........................ 709/321 |
| 2004/0006766 | A1 * | 1/2004 | Kim ............................ 717/174 |

FOREIGN PATENT DOCUMENTS

| | | |
|---|---|---|
| DE | 199 24 610 A1 | 1/2001 |
| JP | 7-36675 | 2/1995 |
| JP | 10-97485 | 4/1998 |
| JP | A-10-091369 | 4/1998 |
| JP | 2001-92642 | 4/2001 |
| JP | A-2001-109617 | 4/2001 |
| JP | A-2001-312453 | 11/2001 |
| JP | A 2002-132400 | 5/2002 |
| JP | A-2002-202944 | 7/2002 |
| JP | A-2002-251366 | 9/2002 |

OTHER PUBLICATIONS

"Perfect Package Management- problem solution in installing / deleting software;" Nakashima; Nikkei Linux BP; pp. 60-83; No. 8; vol. 3; Aug. 8, 2001; (CDDB: National Technical Magazine 200300925007). (with abstract).
Chapter 11 of the Owner's Manual for MFC-9870, published in 2000.

* cited by examiner

*Primary Examiner*—John Chavis
(74) *Attorney, Agent, or Firm*—Oliff & Berridge, PLC

(57) ABSTRACT

In order to enable an user to uninstall multiple device drivers that are required by a single multifunction device all at once, an uninstall system creates during installation an installer registry for the multifunction device that is different from a system registry. Data specifying the multiple related device drivers, such as a scanner driver, printer driver, and fax driver, is stored in association with each other in this installer registry, enabling the multiple device drivers to be easily identified and uninstalled together. Further, by displaying a list dialog box, the user can indicate specific device(s) for which the multiple device drivers are to be uninstalled.

25 Claims, 19 Drawing Sheets

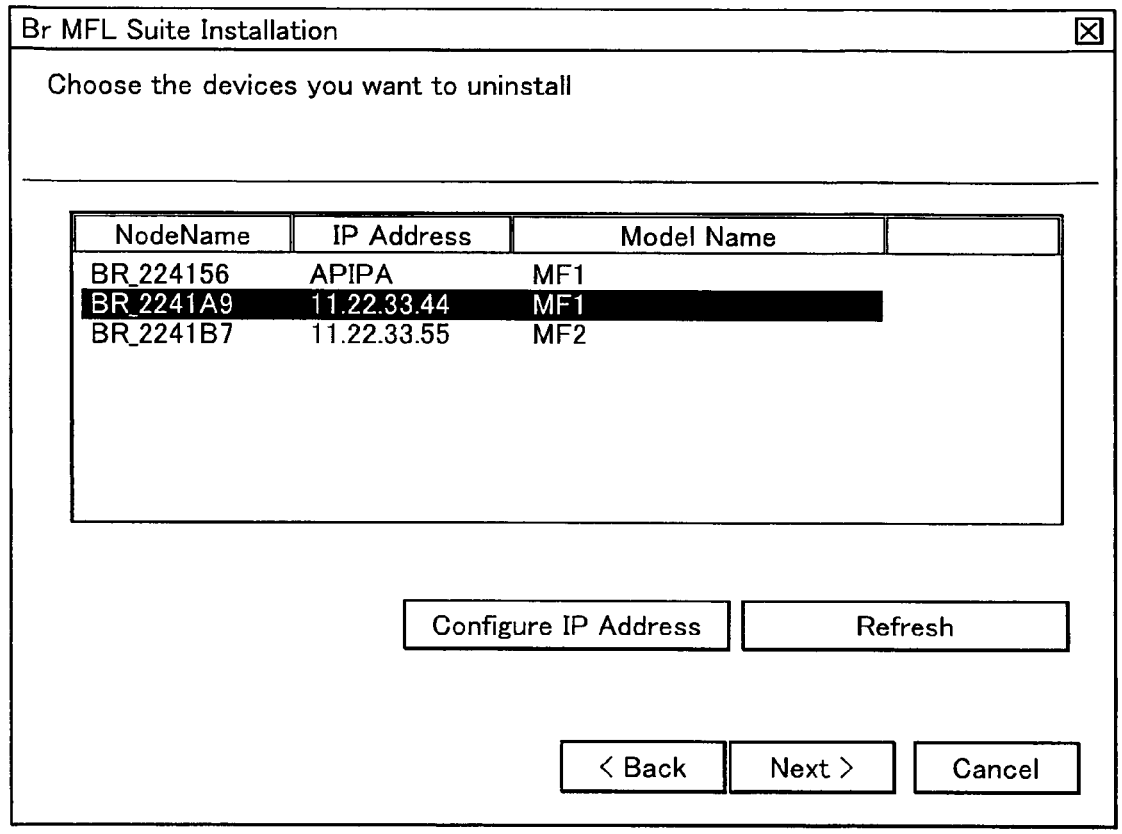

FIG.13 [UNINSTALLATION PROCESS]

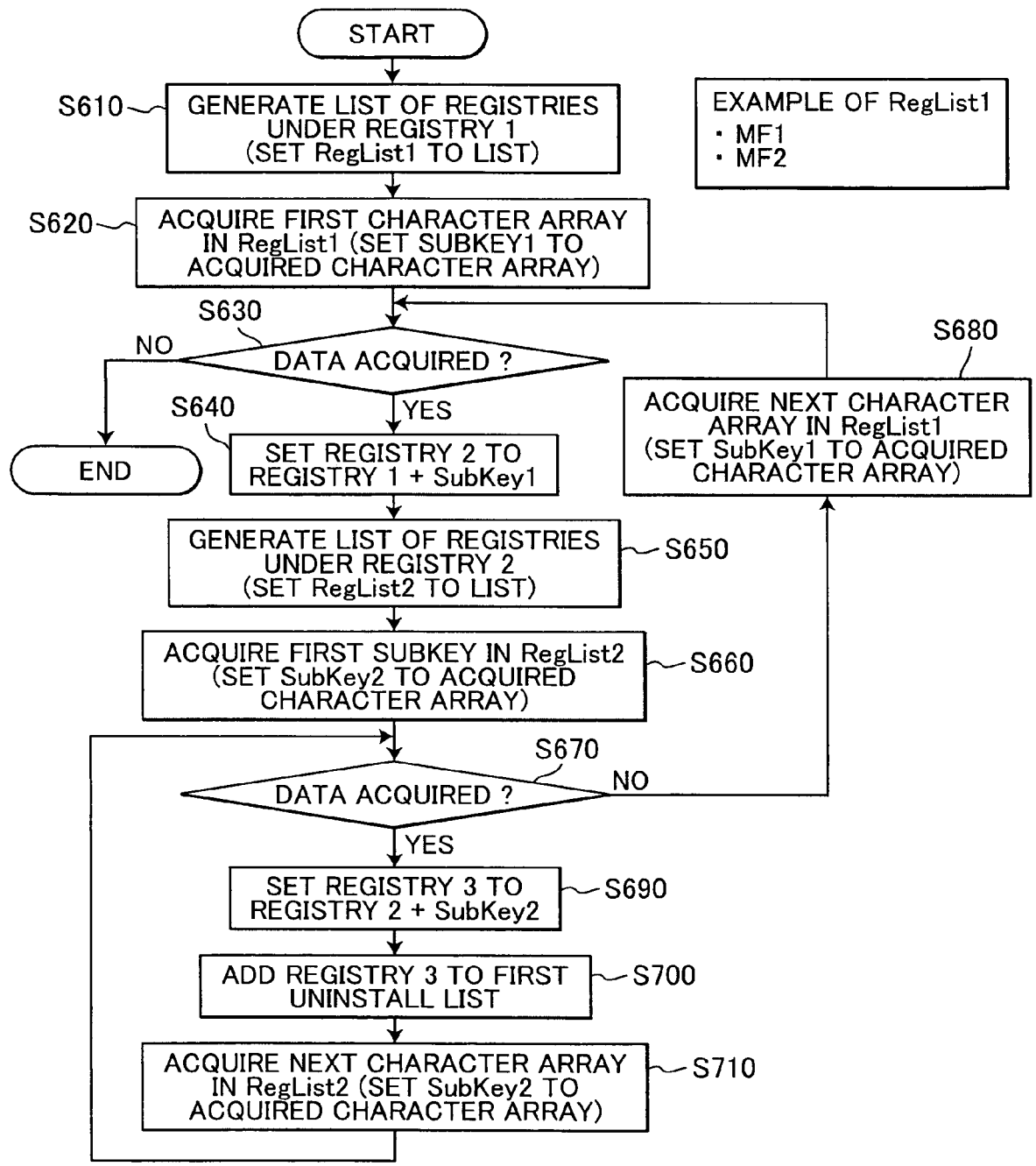

FIG.17(a)

UNINSTALL LIST 1
   HKEY_LOCAL_MACHINE\Software\Br\Br MFL\Z2\MF1\1
   HKEY_LOCAL_MACHINE\Software\Br\Br MFL\Z2\MF1\2
   HKEY_LOCAL_MACHINE\Software\Br\Br MFL\Z2\MF1\3
   HKEY_LOCAL_MACHINE\Software\Br\Br MFL\Z2\MF2\1

FIG.17(b)

IF USER SELECTS "Local" AS UNINSTALL TYPE AND
THE ENTRY IN THE UNINSTALL LIST HAVING "Local" IS "2"

UNINSTALL LIST 2
   HKEY_LOCAL_MACHINE\Software\Br\Br MFL\Z2\MF1\2

UNINSTALL LIST 3
   HKEY_LOCAL_MACHINE\Software\Br\Br MFL\Z2\MF1\Local

FIG.17(c)

IF "ALL" IS SELECTED AS THE UNINSTALL TYPE

UNINSTALL LIST 2
   HKEY_LOCAL_MACHINE\Software\Br\Br MFL\Z2\MF1\1
   HKEY_LOCAL_MACHINE\Software\Br\Br MFL\Z2\MF1\2
   HKEY_LOCAL_MACHINE\Software\Br\Br MFL\Z2\MF1\3
   HKEY_LOCAL_MACHINE\Software\Br\Br MFL\Z2\MF2\1

UNINSTALL LIST 3
   HKEY_LOCAL_MACHINE\Software\Br\Br MFL\Z2\MF1\Local
   HKEY_LOCAL_MACHINE\Software\Br\Br MFL\Z2\MF1\BLP_11.22.33.44_1
   HKEY_LOCAL_MACHINE\Software\Br\Br MFL\Z2\MF1\BLP_11.22.33.45_1
   HKEY_LOCAL_MACHINE\Software\Br\Br MFL\Z2\MF2\BLP_11.22.33.55_1

[Description DISPLAY PROCESS]

BrIst.ini

[Printer Driver]
1=Br MF-8420 Printer
2=Br PC-FAX

UNINSTALL SYSTEM

BACKGROUND OF THE INVENTION

1. Field of the Invention

The present invention relates to an uninstall system, an uninstall method, and a computer program for uninstalling device drivers, such as a scanner driver or a printer driver.

2. Description of Related Art

Conventional install systems well known in the art install application programs on an operating system. This type of install system performs a process to copy each component of an application program having one or more such components (programs and data) to an appropriate location and to set data required for executing the application program under the control of the operating system.

A similar install system known in the art copies device drivers needed to use a device under control of the operating system to a suitable location under the administration of the operating system, and records data necessary for operating the device drivers in the operating system.

However, when using a multifunction device provided with a printer function, scanner function, fax function, and the like (also a copy function implemented by combining the scanner function and printer function) from a personal computer, as disclosed in Japanese unexamined patent application publication No. HEI-10-97485, it is necessary to install on the operating system a printer driver, scanner driver, fax driver, and an application program for using the multifunction device from the personal computer.

SUMMARY OF THE INVENTION

When installing a plurality of software programs to use a single device, much time and effort is required to install each program individually. Therefore, an install system is known to automatically install all software programs required for using the functions of the multifunction device by combining the plurality of software programs in a single package and storing this package on a storage medium, such as a CD-ROM. During installation, each software program is extracted individually from the package and installed in sequence. Another conventional install system prompts the user to select and input settings for the device drivers and applications during the installation process and performs settings based on the inputted selections.

For example, when using the conventional install system provided in an operating system commonly used on personal computers, a first multifunction device (Device 1) having the model name Model A and provided with a printer function and scanner function is connected to the default port of the personal computer, Port A. When installing the device drivers (Scanner Driver A and Printer Driver A), the install system enters settings data in the registry, which is an area in the operating system for storing settings data, as illustrated in FIG. 1(*a*).

In other words, as shown in FIG. 1(*a*), the install system creates a Function-Specific Device 1 key (scanner registry key) 111 for a system registry (scanner) 110. The system sets "Scanner Driver A" as a driver specification data 111*a*, "Scanner Interface A" as an input/output interface specification data 111*b*, and "Scanner A-1" as a scanner name 111*c* and stores this data under the Function-Specific Device 1 key (scanner registry key) 111. Input/output specification data for the scanner can conceivably be the name of the STI driver (standard text interface driver) and the IP address of the scanner with which the STI driver should communicate. The system determines whether the Scanner Driver A is already stored in the scanner driver storage area of the operating system. If the driver is not already stored in the storage area, then the Scanner Driver A stored on a CD-ROM or the like is copied to the scanner driver storage area and a request is issued to the operating system to set the Scanner Driver A to Port A.

Similarly, as shown in FIG. 1(*a*), the install system creates a Function-Specific Device 1 key (printer registry key) 121 for the system registry (printer) 120. The system sets "Printer Driver A" as a driver specification data 121*a*, "Printer Interface A" as input/output interface specification data 121*b*, and "Printer A-1" as a printer name 121*c* and stores this data under the Function-Specific Device key (printer registry key) 121. The input/output interface specification data for the printer can conceivably be a port name or the like specifying a port, which is the logical interface recorded in the operating system. The port is stored in the operating system by a port driver, which is the interface driver. The system then determines whether Printer Driver A is already stored in the printer driver storage area of the operating system. If the driver is not already stored in the storage area, the system copies Printer Driver A from a CD-ROM or the like to the printer driver storage area and issues a request to the operating system to set Printer Driver A to Port A.

Further, as shown in FIG. 1(*a*), the install system sets "Model A" as a model name 131 and stores this data under a vendor registry 130.

As a result, if the user clicks on a folder (scanner) managed by the operating system, the operating system displays a folder (scanner) window 150 shown in FIG. 1(*b*) on the display device of the personal computer based on the settings data. Displayed within this window 150 are a scanner name, which is "Scanner A-1" in this case, and an icon 151*a*. When the user clicks on this icon, the operating system executes a process to acquire the status of the first multifunction device connected to Port A that corresponds to Scanner A-1. The status is acquired from Port A, using Scanner Driver A and Scanner Interface A, and displayed on the user's monitor. The operating system also displays a dialog box enabling the user to view and modify settings for Scanner A-1, to store settings modified by the user in the display dialog box, and to output these changes to the first multifunction device via Port A using Device Driver A (Scanner Driver A). Further, if the operating system receives a scan request from an application program specifying Scanner A-1, the operating system can control the first multifunction device via Port A and according to Scanner Driver A and Scanner Interface A to execute a scan operation.

Similarly, when the user clicks on the folder (printer) managed by the operating system, the operating system displays a folder (printer) window 160 shown in FIG. 1(*b*) on the display device of the personal computer based on the settings data. Displayed within this window 160 are a printer name, which is "Printer A-1" in this case, and an icon 161*a*. When the user clicks on this icon, a process is executed to acquire the status of the first multifunction device connected to Port A that corresponds to Printer A-1. The status is acquired from Port A, using Printer Driver A and Printer Interface A, and displayed on the user's monitor. The operating system also displays a dialog box enabling the user to view and modify settings for Printer A-1, to store settings modified by the user in the display dialog box, and to output the changes to the first multifunction device via Port A using Device Driver A (Printer Driver A). Further, if the operating system receives a print request from an application program specifying Printer A-1, the operating system can control the first multifunction device via Port A using Printer Driver A and Printer Interface A to execute a print operation.

Further, when a second multifunction device (Device 2) of the same model as the first multifunction device (Model A) is connected to a Port B of the personal computer to which the first multifunction device is also connected, the user inputs data to the install system for connecting Device 2 to Port B. Since Scanner Driver A and Printer Driver A are already installed, the install system skips the process to copy these device drivers and executes a process to set registries and to issue a request to the operating system to set the device drivers to Port B. As a result, as shown in FIG. 2(*a*), a Function-Specific Device 2 key (scanner registry key) 112 is added to the system registry (scanner) 110. The system also sets "Scanner Driver A" as a driver specification data 112*a*, "Scanner Interface B" as an input/output interface specification data 112*b*, and "Scanner A-2" as a scanner name 112*c* under the Function-Specific Device 2 key 112. Similarly, a Function-Specific Device 2 key (printer registry key) 122 is added to the system registry (printer) 120. The system sets "Printer Driver A" as a driver specification data 122*a*, "Printer Interface B" as an input/output interface specification data 122*b*, and "Printer A-2" as a printer name 122*c* under the Function-Specific Device 2 key 122.

In this way, a separate connection point (port in this example) for one device driver can be added and set in addition to the connection point that has been set when the same device driver has been first installed. The settings data for the device driver is managed for each connection point. In the example described above, as shown in FIG. 2(*b*), icons 151*a* and 151*b* are created for each connection point, enabling the user to select a connection point corresponding to one of the icons from the application program or the operating system in order to select the device to be used.

With this install system, software programs required for using a device can be easily installed, even when a plurality of software programs must be installed to use a single device, such as a multifunction device. Accordingly, the user can quickly use the device from a personal computer.

Further, an uninstall system for designating and uninstalling a plurality of installed application programs at once is known in the art. When a plurality of application programs have been installed, this uninstall system performs a process to delete all individual components of the application programs and to delete all settings data required for operating the application programs.

However, since it is impossible to specify the association of device drivers for each function of a device after installation, it is impossible to uninstall a plurality of device drivers all at once.

For example, when a printer driver, scanner driver, and fax driver are installed on an operating system, only data required to operate these device drivers is set in the operating system during installation. Hence, it is impossible to specify the association of these device drivers and, thus, the device drivers cannot be uninstalled all at once.

In view of the foregoing, it is an object of the present invention to provide an uninstall system enabling the user to easily uninstall a plurality of device drivers required for using a single device.

In order to attain the above and other objects, the present invention provides an uninstall device, including: installing means, additional installing means, uninstall request receiving means, and uninstalling means. The installing means is for executing an installation process for recording, in a device registration area managed by an operating system, function-specific device specification data, which is data to enable an operating system to identify a function of a device, in association with device to driver specification data, which is data for specifying a device driver as a program for controlling the device to execute the function. The additional installing means is for performing an additional installation process for recording at least one of the function-specific device specification data and the device driver specification data in an additional registration area in association with device specification data, which is data indicating the device. The uninstall request receiving means is for performing a process to receive an uninstall request from a user targeting the device. The uninstalling means is for performing, when an uninstall request for the device is received from the user by the uninstall request receiving means, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

According to another aspect, the present invention provides an uninstall device, including: an operating system; a memory; an installing portion; an additional installing portion; an uninstall request receiving portion; and an uninstalling portion. The installing portion executes an installation process for recording, in a device registration area managed by the operating system, function-specific device specification data, which is data to enable an operating system to identify a function of a device, in association with device driver specification data, which is data for specifying a device driver as a program for controlling the device to execute the function. The additional installing portion performs an additional installation process for recording at least one of the function-specific device specification data and the device driver specification data in an additional registration area in association with device specification data, which is data indicating the device. The uninstall request receiving portion performs a process to receive an uninstall request from a user targeting the device. The uninstalling portion performs, when an uninstall request for the device is received from the user by the uninstall request receiving portion, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

According to another aspect, the present invention provides an uninstall method, including: executing an installation process for recording, in a device registration area managed by an operating system, function-specific device specification data, which is data to enable an operating system to identify a function of a device, in association with device driver specification data, which is data for specifying a device driver as a program for controlling the device to execute the function; performing an additional installation process for recording at least one of the function-specific device specification data and the device driver specification data in an additional registration area in association with device specification data, which is data indicating the device; performing a process to receive an uninstall request from a user targeting the device; and performing, when an uninstall request for the device is received from the user, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

According to another aspect, the present invention provides an uninstall program, including the programs of: executing an installation process for recording, in a device registration area managed by an operating system, function-specific device specification data, which is data to enable an operating system to identify a function of a device, in association with device driver specification data, which is data for specifying a device driver as a program for controlling the device to execute the function; performing an additional installation process for recording at least one of the function-specific device specification data and the device driver specification data in an additional registration area in association with device specification data, which is data indicating the device; performing a process to receive an uninstall request from a user targeting the device; and performing, when an uninstall request for the device is received from the user, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

According to another aspect, the present invention provides an uninstall system, including: installing means, uninstall request receiving means, and uninstalling means. The installing means is for registering, in a device registration area managed by an operating system, data of a group of device drivers for a device, the group of device drivers including a plurality of device drivers to be used by the operating system to control the device to perform a plurality of functions. The uninstall request receiving means is for receiving a user's instruction to uninstall the group of device drivers for the device. The uninstalling means is for canceling, upon receipt of the instruction, registration of the group of device drivers from the device registration area.

According to another aspect, the present invention provides an uninstall system, including: a memory and a controller. The controller registers, in a device registration area that is prepared in the memory and that is managed by an operating system, data of a group of device drivers for a device, the group of device drivers including a plurality of device drivers to be used by the operating system to control the device to perform a plurality of functions, that receives a user's instruction to uninstall the group of device drivers for the device, and that cancels, upon receipt of the instruction, registration of the group of device drivers from the device registration area.

According to another aspect, the present invention provides a storage medium storing an uninstall program readable by a computer, the uninstall program including the programs of: executing an installation process for recording, in a device registration area managed by an operating system, function-specific device specification data, which is data to enable an operating system to identify a function of a device, in association with device driver specification data, which is data for specifying a device driver as a program for controlling the device to execute the function; performing an additional installation process for recording at least one of the function-specific device specification data and the device driver specification data in an additional registration area in association with device specification data, which is data indicating the device; performing a process to receive an uninstall request from a user targeting the device; and performing, when an uninstall request for the device is received from the user, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

BRIEF DESCRIPTION OF THE DRAWINGS

The above and other objects, features and advantages of the invention will become more apparent from reading the following description of the preferred embodiments taken in connection with the accompanying drawings in which:

FIGS. 1(a) and 1(b) are explanatory diagrams showing a first example of a conventional installation and uninstallation process, wherein FIG. 1(a) illustrates how a conventional install system enters settings data in registries when installing device drivers for one multifunction device, and FIG. 1(b) illustrates a folder window displayed based on the settings data of FIG. 1(a);

FIGS. 2(a) and 2(b) are explanatory diagrams showing a second example of a conventional installation and uninstallation process, wherein FIG. 2(a) illustrates how the conventional install system enters settings data in registries when installing device drivers for two multifunction devices of the same model, and FIG. 2(b) illustrates folder windows displayed based on the settings data of FIG. 2(a);

FIG. 8 is an explanatory diagram showing an example dialog box for selecting an IP address for the target of installation;

FIG. 9 is an explanatory diagram showing an inf file as an example driver data file;

FIG. 16(a) is a flowchart showing steps in a first uninstall list creation process described in S600 of FIG. 13;

FIG. 16(b) shows examples of a Registry 1, Registry 2, and Registry 3 created in the process of FIG. 16(a).

FIG. 17(a) is an explanatory diagram showing an example of the first uninstall list, which is obtained through the process of FIG. 16(a) based on the example registry in FIG. 11;

FIG. 17(b) is an explanatory diagram showing an example of the second and third uninstall lists which are obtained through the process of FIG. 13 when the user selects "Local" as the uninstall type and the only entry in the first uninstall list having "Local" as the port name is "2";

FIG. 17(c) is an explanatory diagram showing an example of the second and third uninstall lists which are obtained through the process of FIG. 13 when the user selects "All" as the uninstall type;

DESCRIPTION OF THE PREFERRED EMBODIMENTS

An uninstall system, uninstall method, and computer program according to a preferred embodiment of the present invention will be described while referring to the accompanying drawings.

Figure 1A:
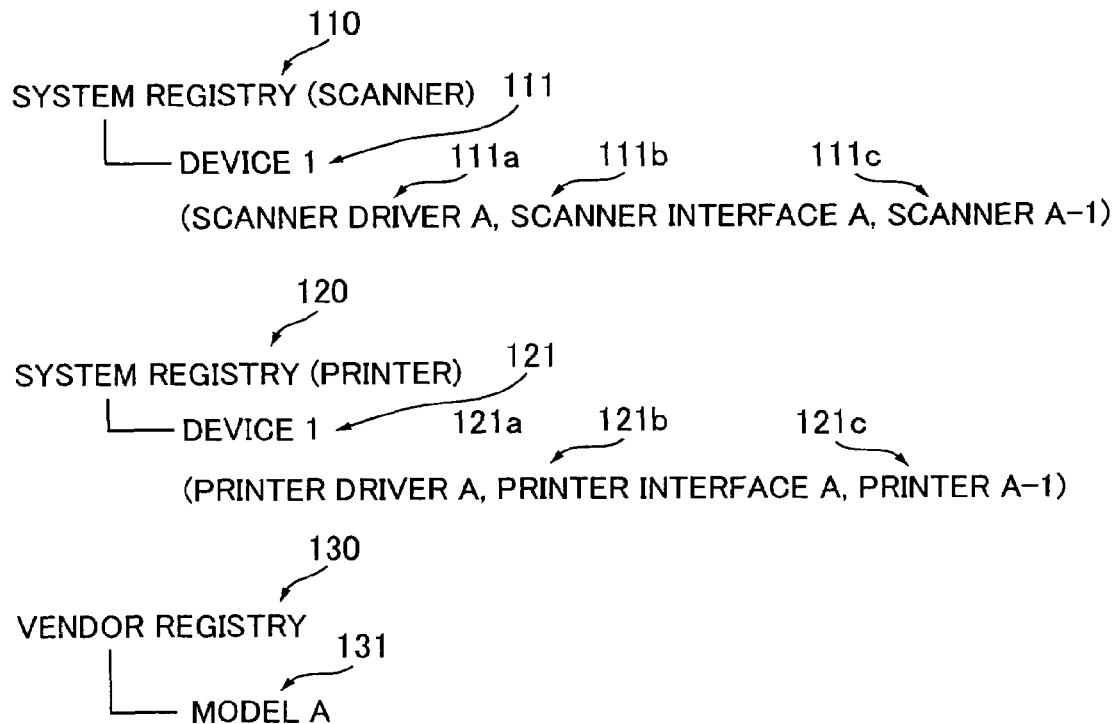
Figure 1B:
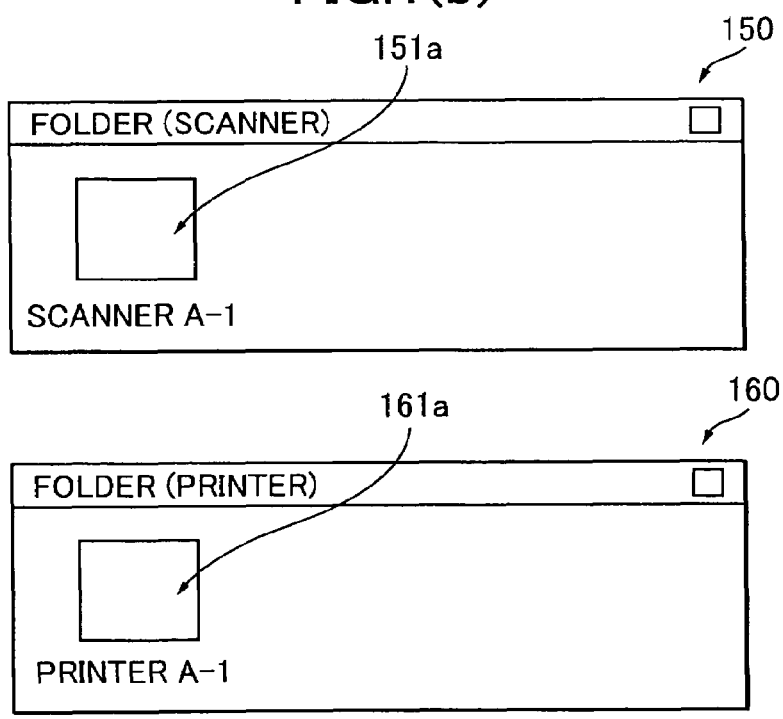
Figure 2A:
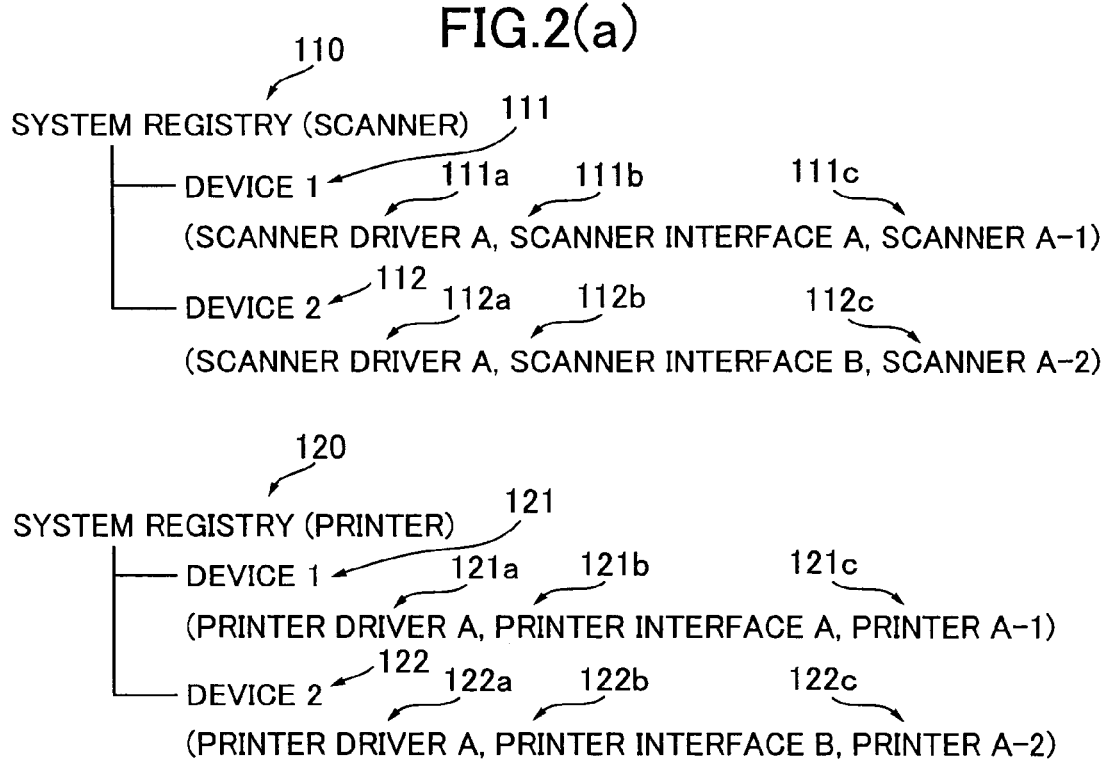
Figure 2B:
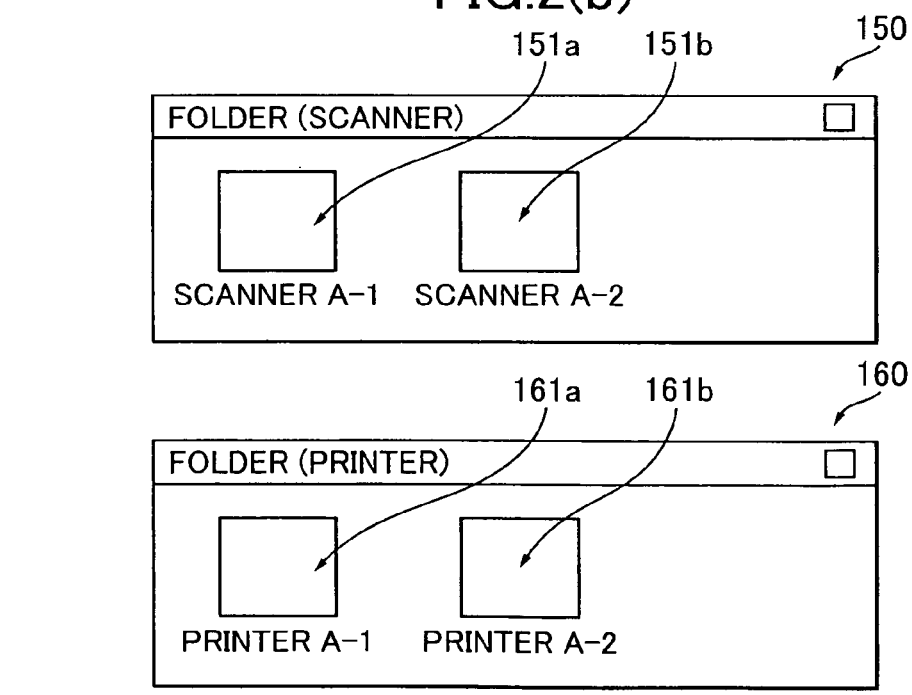
Figure 3:
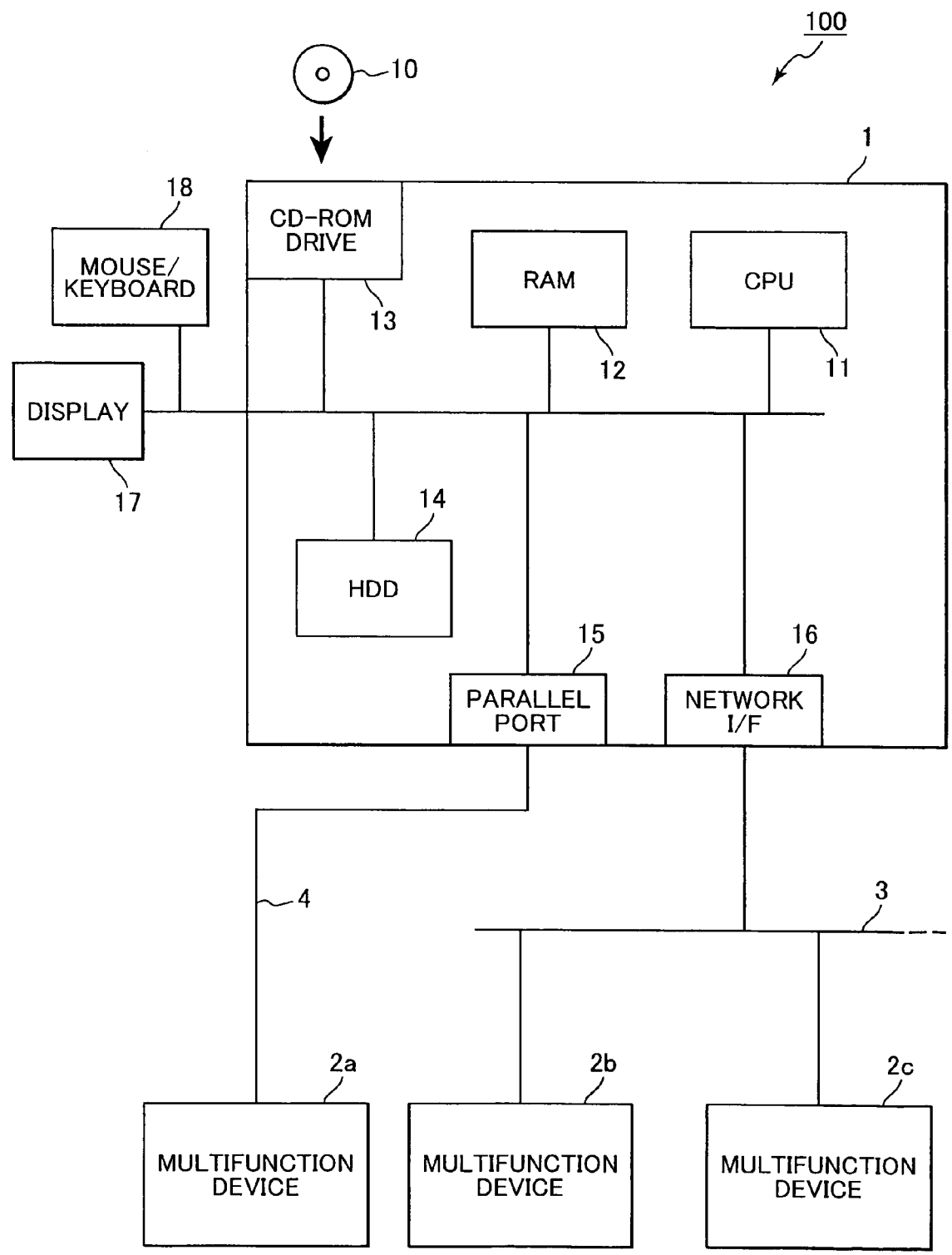
FIG. 3 is an explanatory diagram showing the structure of an uninstall system according to a preferred embodiment of the present invention.

FIG. 3 is a block diagram showing the construction of a system 100 employing multifunction devices. The system 100 includes a personal computer 1 functioning as the uninstall system of the preferred embodiment, and multifunction devices 2 (2a, 2b, and 2c).

The personal computer 1 is a common personal computer including a CPU 11, a RAM 12, a CD-ROM drive 13, a hard disk drive 14, a parallel port 15, and a network interface 16.

The personal computer 1 is connected to a display device 17. The personal computer 1 can run an operating system (MS-Windows (registered trademark)) stored on the hard disk drive 14 and display various data on the display device 17. The personal computer 1 is also connected to a mouse and keyboard 18 that enable the user of the personal computer 1 to select and input data.

The system 100 is also provided with a CD-ROM 10 that can be mounted in the CD-ROM drive 13. The CD-ROM 10 stores various programs including an installer, an uninstaller, and device drivers. The installer and the uninstaller are for controlling the computer to function as an uninstall system. When the CD-ROM 10 is inserted in the CD-ROM drive 13, the CPU 11 can read programs and data into the RAM 12 from the CD-ROM 10 and execute processes using the operating system stored on the hard disk drive 14.

One end of a printer cable 4 is connected to the parallel port 15 of the personal computer 1, while the other end is connected to the multifunction device 2a, enabling the multifunction device 2a to communicate electrically with the personal computer 1. The network interface 16 of the personal computer 1 is connected to a network 3. The multifunction devices 2b and 2c are also connected to the network 3. Each multifunction device 2 (2a, 2b, 2c) has at least one function among a printer function, an image scanner function, and a fax communication function.

Upon receiving signals from the CD-ROM drive 13 indicating that the CD-ROM 10 has been inserted therein, the CPU 11 controls the CD-ROM drive 13 to read and execute the install program stored on the CD-ROM 10.

Next, the installation process implemented on the personal computer 1 when the CPU 11 executes the install program will be described with reference to FIGS. 4 through 12.

Figure 4:
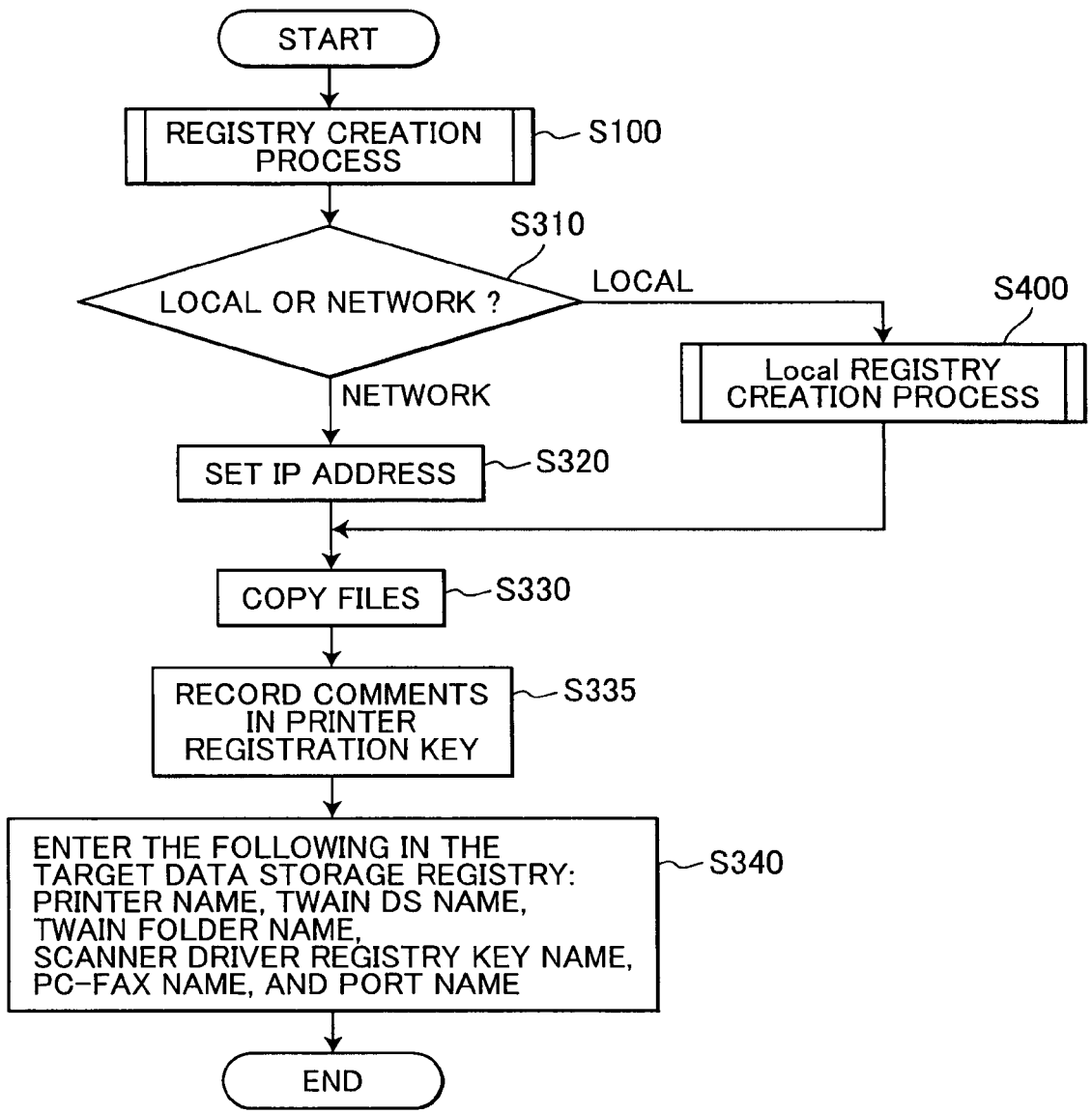
FIG. 4 is a flowchart showing steps in an installation process.
Figure 5:
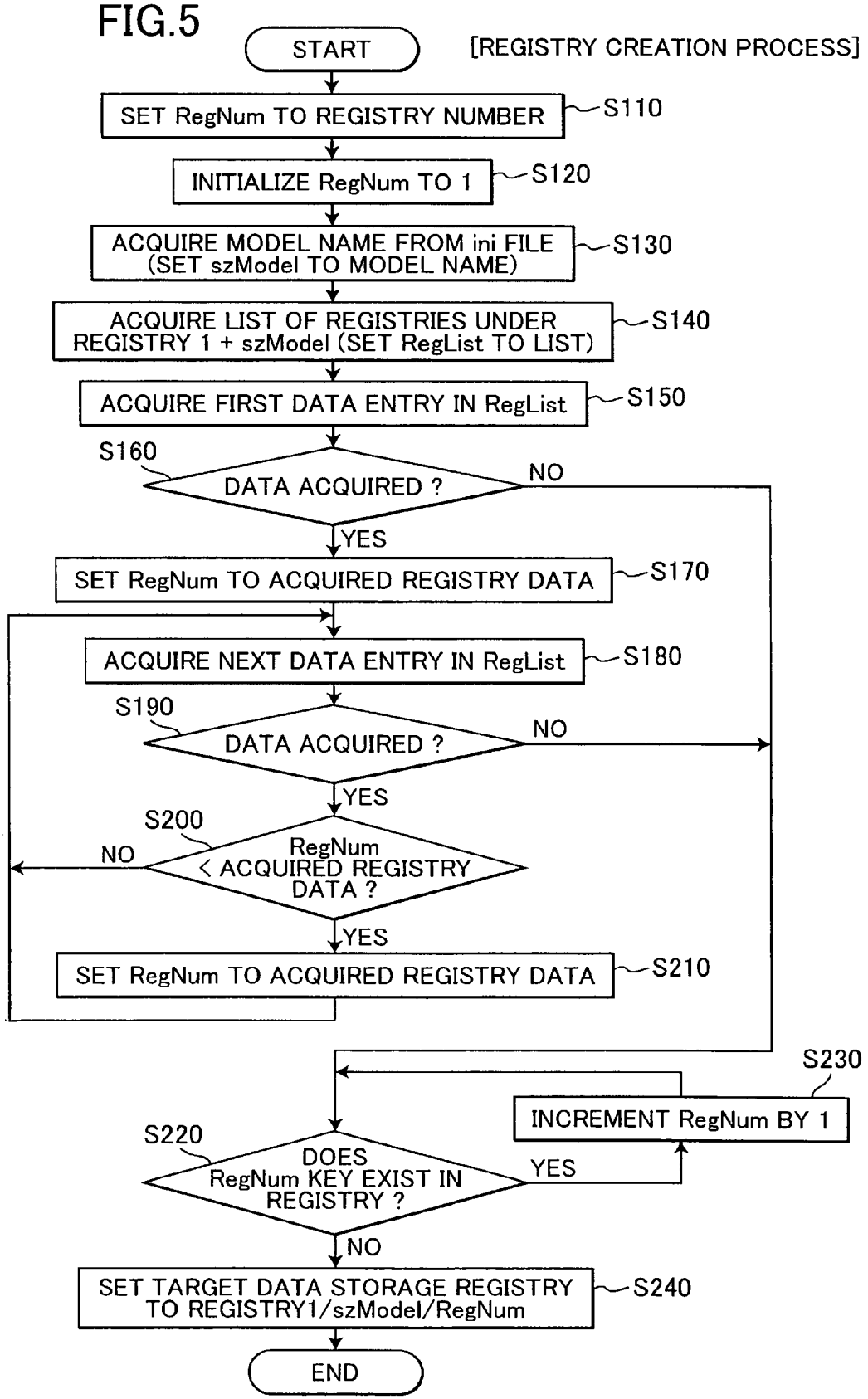
FIG. 5 is a flowchart showing steps in a registry creation process described in S100 of FIG. 4.
Figure 6:
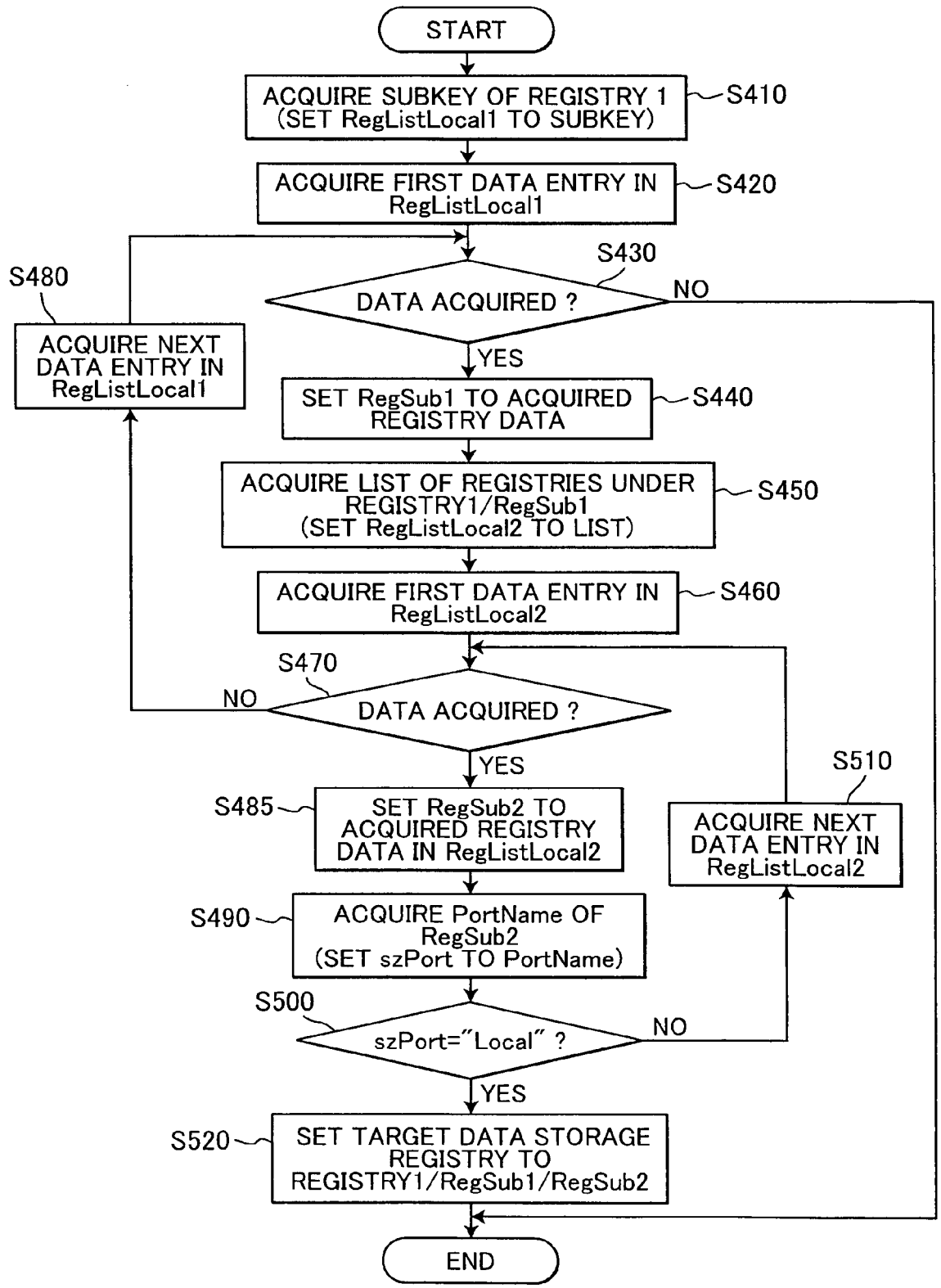
FIG. 6 is a flowchart showing steps in a local registry creation process described in S400 of FIG. 4.

FIG. 4 is a flowchart showing steps in the installation process. FIG. 5 is a flowchart showing steps in a registry creation process described in S100 of FIG. 4. FIG. 6 is a flowchart showing steps in a local registry creation process described in S400 of FIG. 4. The registry is a file storing settings that is managed by the operating system and is stored on the hard disk drive 14.

When a user newly connects one multifunction device 2 (2a, 2b, 2c, or the like) of the model name "BrMF1," for example, to the personal computer 1 and desires to install necessary drivers for the multifunction device 2 to the personal computer 1, the user inserts the CD-ROM 10 for the device 2 in the CD-ROM drive 13 and inputs his/her instruction to start the installation process. As a result, the personal computer 1 starts executing the installation process by executing the installer program. When the installation process is started, as shown in FIG. 4, a registry creation process is first executed in S100.

This process is shown in FIG. 5.

As shown in FIG. 5, first, in S110, a variable RegNum is created to indicate the registry number and in S120 is initialized to 1 (RegNum=1).

In S130, the CPU 11 acquires the model name from an ini file stored on the CD-ROM 10 and sets a variable szModel to this model name. In this example, the model name "BrMF1" is set to the variable szModel.

In S140, the CPU 11 then lists up all the registries existing in the HDD 14 under Registry 1+szModel. The Registry 1 is defined as the base path in a registry incorporated in the installer.

Figure 7:
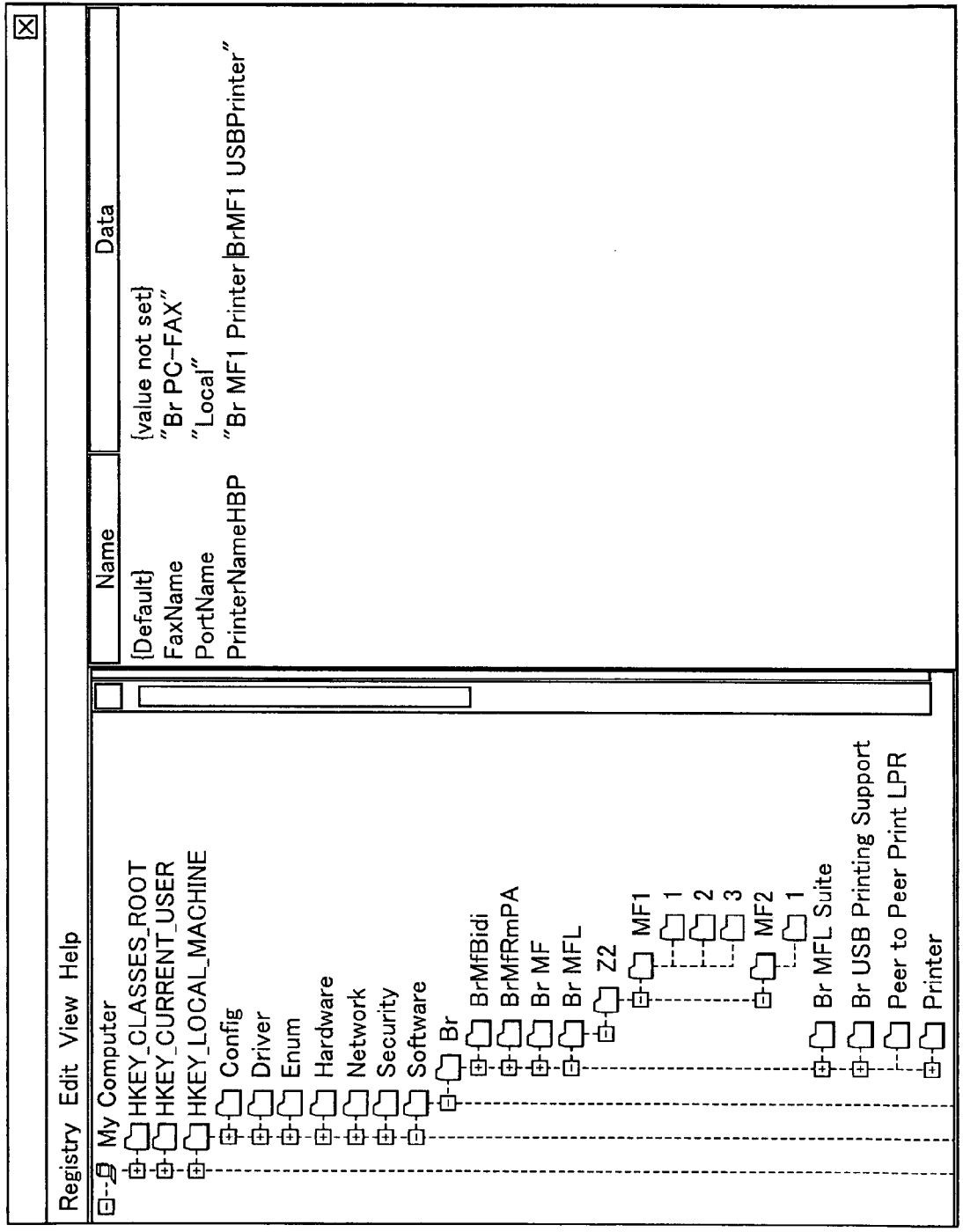
FIG. 7 is an explanatory diagram showing an example registry when the port is local.

Now assume that three multifunction devices 2 of the model "BrMF1" have already been connected to the personal computer 1 as shown in FIG. 7 and that Registry 1 is defined as "\HKEY_LOCAL_MACHINE\Software\Br\Br MFL\Z2\" and szModel is "BrMF1." The CPU 11 acquires a list of registries under "\HKEY_LOCAL_MACHINE\Software\Br\Br MFL\\Z2\BrMF1". The CPU 11 sets RegList to the registry list under this model name.

In S150 the CPU 11 extracts the first data entry in RegList. For example, if the registry is that shown in FIG. 7, the CPU 11 extracts "1" as the first entry under "\HKEY_LOCAL_MACHINE\Software\Br\Br MFL\Z2\BrMF1." It is noted that when no driver for this model "BrMF1" has been installed on the personal computer 1, then the key "\HKEY_LOCAL_MACHINE\Software\Br\Br MFL\Z2\BrMF1" itself does not exist in the registry of the HDD 14 and therefore the CPU 11 will be unable to extract the first data entry in RegList.

In S160 the CPU 11 determines whether the first data entry in RegList has been acquired in S150. If the first data entry has been successfully acquired (S160: YES), then the CPU 11 advances to S170. On the other hand, if the CPU 11 has failed to acquire the first entry (S160: NO), then the CPU 11 advances to S220.

In S170 the CPU 11 sets RegNum to the acquired registry data. In the example of FIG. 7 described above, RegNum is now set to "1".

In S180 the CPU 11 attempts to acquire the next data entry in RegList. In S190 the CPU 11 determines whether the data has been successfully acquired. If the data has been acquired (S190: YES), then the CPU 11 advances to S200.

Otherwise (S190: NO), the CPU 11 advances to S220.

In S200 the CPU 11 determines whether the registry data acquired in S180 is larger than RegNum. If the registry data is larger than RegNum (S200: YES), then the CPU 11 advances to S210.

In S210 the CPU 11 sets RegNum to the value of the acquired registry data and subsequently returns to S180. However, if the acquired registry data is not larger than RegNum (S200: NO), then the CPU 11 returns to S180 without changing the value of RegNum. In other words, the CPU 11 searches for the greatest value among the acquired registry data. In the example of FIG. 7 described above, the largest value is "3".

In S220 the CPU 11 determines whether the RegNum key exists in the registry. If the RegNum key exists (S220: YES), then in S230 the CPU 11 increments RegNum by 1. On the other hand, if the RegNum key does not exist (S220: NO), then the CPU 11 advances to S240. As a result, in the example of FIG. 7 described above, RegNum is set to 3+1=4. It is noted that when no driver for this model "BrMF1" has been installed on the personal computer 1 (no in S160 and no in S220), then RegNum is set to 1.

In S240 the CPU 11 sets a target data storage registry (installer registry) to Registry1\szModel\RegNum. In the example of FIG. 7, the data storage registry is set to "\HKEY_LOCAL_MACHINE\Software\Br\Br MFL\Z2\BrMF1\4." Subsequently, the CPU 11 advances to S310 in FIG. 4.

It is noted that if no multifunction device 2 of the model "BrMF1" has been connected to the personal computer 1, the data storage registry is set to "\HKEY_LOCAL_MACHINE\Software\Br\Br MFL\Z2\BrMF1\1." If only two multifunction devices 2 of the model "BrMF1" have already been connected to the personal computer 1, the data storage registry is set to "\HKEY_LOCAL_MACHINE\Software\Br\Br MFL\Z2\BrMF1\3."

In S310 the CPU 11 determines whether the device being installed (multifunction device 2) is a local connection or a network connection by displaying a dialog box and prompting the user to input a selection.

If the device is a local connection (S310: Local), then the CPU 11 advances to S400 and executes a local registry creation process shown in FIG. 4. On the other hand, if the device is a network connection (S310: Network), then the CPU 11 advances to S320.

The local registry creation process of FIG. 6 is for resetting the target data storage registry to a local registry if the local registry already exists in the HDD 14. In the system 100 according to the preferred embodiment, this process ensures that only one connection to a multifunction device can be recognized as a local connection by the personal computer 1.

As shown in FIG. 6, first, in S410, the CPU 11 acquires subkeys located directly under Registry 1 ("\HKEY_LOCAL_MACHINE\Software\Br\Br MFL\Z2", in this example), and sets RegListLocal1 to these subkeys.

In S420 the CPU 11 attempts to extract the first data entry under RegListLocal1 as the acquired registry data and determines in S430 whether a data entry has been acquired. If a data entry has been acquired (S430: YES), then the CPU 11 advances to S440. Otherwise (S430: NO), the CPU 11 advances to S330 in FIG. 4.

In S440 the CPU 11 sets RegSub1 to the acquired registry data.

In S450 the CPU 11 acquires a list of registries under Registry1\RegSub1 and sets RegListLocal2 to this list.

In S460 the CPU 11 attempts to acquire the first data entry in RegListLocal2 and determines in S470 whether an entry has been acquired. If an entry has been acquired (S470: YES), then in S485 the CPU 11 sets RegSub2 to the acquired registry data in RegListLocal2 and advances to S490. However, if a data entry has not been acquired (S470: NO), then the CPU 11 advances to S480.

In S480 the CPU 11 attempts to acquire the next data entry in RegListLocal1 and returns to S430.

In S490 the CPU 11 acquires the value of a PortName under RegSub2 and sets szPort to this value. In S500 the CPU 11 determines whether szPort is "Local." If szPort is "Local" (S500: YES), then the CPU 11 advances to S520. However, if szPort is not "Local" (S500: NO), then the CPU 11 advances to S510. In S510 the CPU 11 attempts to acquire the next data entry in RegListLocal2 and returns to S470.

In S520 the CPU 11 sets the target data storage registry to Registry1\RegSub1\RegSub2 and advances to S330 in FIG. 4. In this way, if a "Local" registry already exists, then the target data storage registry is changed to that registry. However, if a "Local" registry does not exist (S430: NO), then the data storage registry remains set to the registry created in S100.

Now assume that three multifunction devices 2 of the model "BrMF1" have been already connected to the personal computer 1 and therefore that the target data storage registry for the new multifunction device 2 is set to "\HKEY_LOCAL_MACHINE\Software\Br\Br MFL\Z2\BrMF1\4" in S240. If one of the three multifunction devices 2 that is indicated by the registry "\HKEY_LOCAL_MACHINE\Software\Br \Br MFL\Z2\BrMF1\2" is connected to the local port, the target data storage registry is changed to the registry \HKEY_LOCAL_MACHINE\Software\Br\Br MFL\Z2\BrMF1\2" in S520.

Referring back to FIG. 4, if the device is a network connection (S310: Network), in S320 the CPU 11 sets the IP address. That is, the CPU 11 acquires data for devices connected to the network interface 16 via the network 3, displays the IP addresses and model names from among this data in a dialog box, such as that shown in FIG. 8, and prompts the user to make a selection. When the user makes a selection, the CPU sets the IP address of the device 2 that is targeted for installation to the selected IP address.

In S330 the CPU 11 transfers the inf file (driver information file) shown in FIG. 9 to the operating system, copies driver files (printer driver, scanner driver, and fax driver) to their respective driver storage areas for the operating system on the hard disk drive 14, and issues a request to the operating system to register these drivers.

More specifically, the CPU 11 directs the operating system to register settings data in the system registry for each driver. In other words, the CPU 11 directs the operating system to store settings data under the system registry keys.

In addition, the CPU 11 copies an uninstaller program and icon data from the CD-ROM 10 onto the hard disk drive 14.

After the operating system has thus stored the settings data under the system registry keys as described above in S330, the program proceeds to S335.

In S335 the CPU 11 records the port name, or "USB," "LPT," or the like as comments under the printer registration key (device driver specification data for printer) of the system registry for printer and fax. In this way, installation is performed to install the IP address that is selected in S320 in a form that is included in the port name (PortName). Next, the program proceeds to S340.

In S340, the CPU 11 records data required for uninstallation in the target data storage registry (installer registry). This required data includes a PC-FAX name (FaxName), a port name (PortName), a printer name (PrinterNameHBP), a scanner driver registry key name (TwainClassData), a TWAIN folder name (TwainDirName), and a TWAIN DS name (TwainDSName) for the multifunction device 2 now being installed.

More specifically, the CPU 11 reads in S340 the settings data from the registry keys, and writes the settings data to the target data storage registry. One method for identifying in S340 those registry keys, into which the operating system has just stored the settings data in S330, is to request in S330 that a prescribed value be stored in the registry keys in which the settings data is stored and detecting in S340 the registry keys that hold this prescribed value.

The printer name (PrinterNameHBP) serves as function-specific device specification data for printer. The TWAIN DS name (TwainDSName) serves as function-specific device specification data for scanner. The scanner driver registry key name (TwainClassData) serves as device driver specification data for scanner. The port name (PortName) serves as input/output interface specification data for identifying an input/output interface used for performing communications to control a device installed.

It is noted that representative examples of the input/output interface include: a combination of a network port and address; and a USB port. Representative examples of the port name (input/output interface specification data) therefore include: the STI driver name+address; and the port name.

Figure 12:
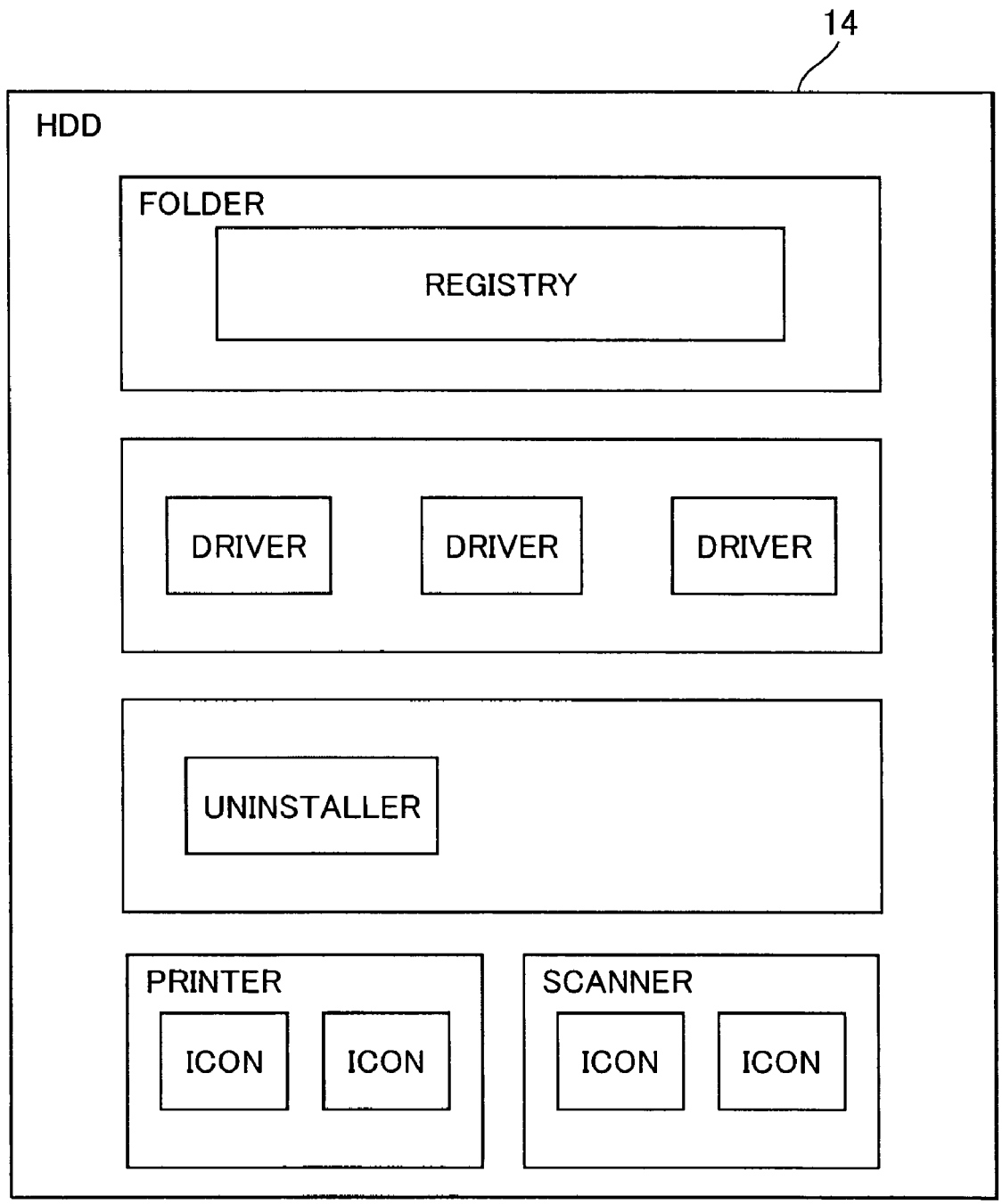
FIG. 12 is an explanatory diagram showing data stored on the hard disk drive when the installation process has completed.

When the installation process for the multifunction device 2 is completed, the registries; files for drivers (printer driver, scanner driver, and fax driver); the uninstaller; and the icon data are stored on the hard disk drive 14 as shown in FIG. 12.

Figure 10A:
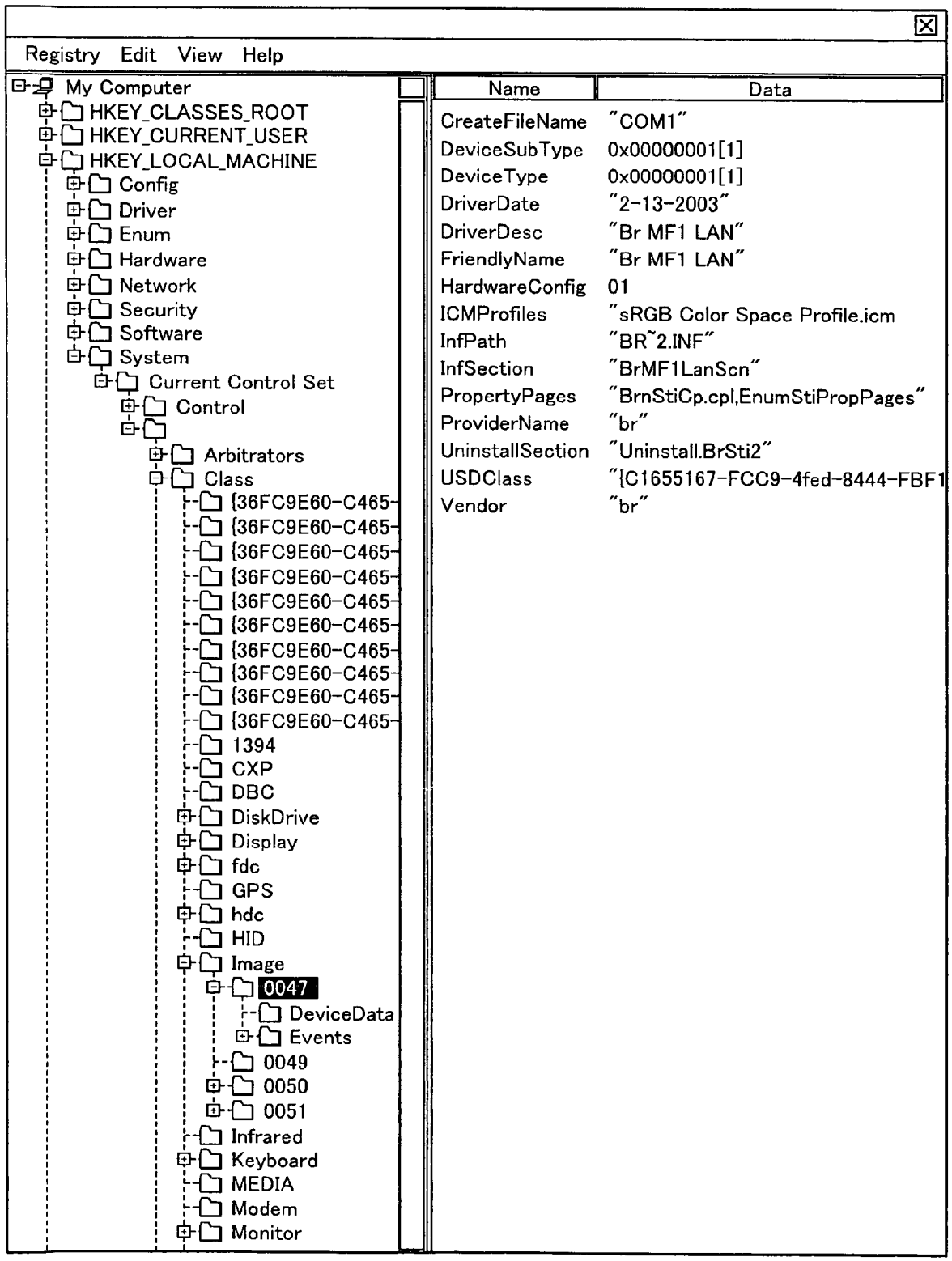
FIG. 10(a) is an explanatory diagram showing an example entry in the system registry as settings data for the scanner driver.

FIG. 10(a) shows an example of settings data stored in the data column for the scanner driver registered in the system registry key with the scanner registry key name "0047" ("TwainClassData") for a network scanner. The scanner registry key name serves as device driver specification data for specifying a device driver (scanner driver, in this example) as a program for controlling the installed device to execute the corresponding function (scanner function, in this example). The settings data includes scanner name "Br MF1 LAN", which serves as function-specific device specification data for enabling the operating system to identify a function (scanner function, in this example) of the device installed.

Figure 10B:
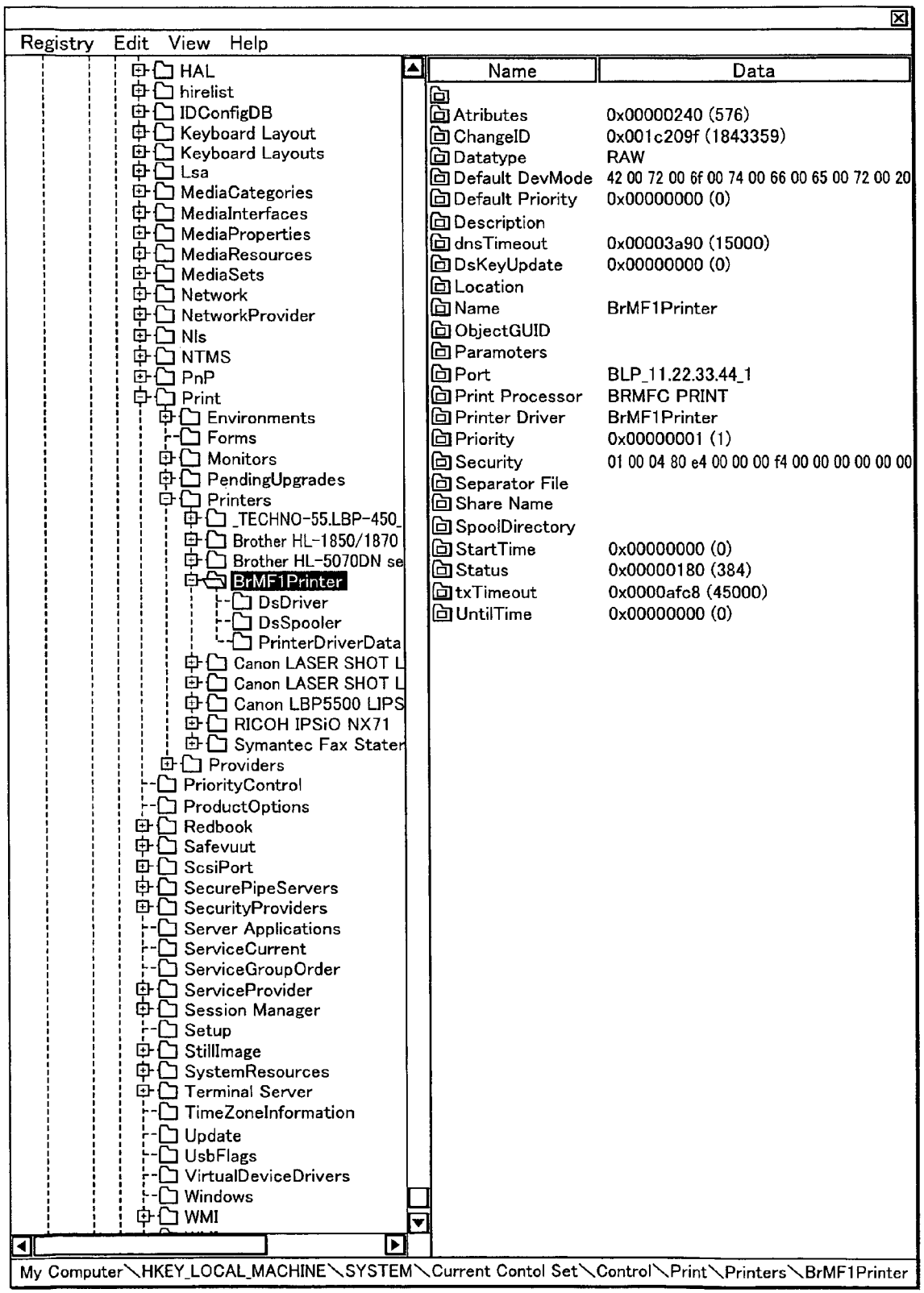
FIG. 10(b) is an explanatory diagram showing an example entry in the system registry as settings data for the printer driver.

As shown in FIG. 10(b), settings data are registered for a printer driver in another system registry key with a printer registry key name "Br MF1 Printer" for a network printer. The printer registry key name serves as device driver specification data for specifying a device driver (printer driver, in this example) as a program for controlling the installed device 2 to execute the corresponding function (printer function, in this example).

The settings data includes: printer name "Br MF1 Printer", for example, which serves as function-specific device specification data for enabling the operating system to identify a function (printer function, in this example) of the device installed; and port name "BLP_11.22.33.44_1", for example, which serves as an input/output interface specification data for specifying an input/output interface used for performing communication between the personal computer 1 and the installed device 2. It is noted that the port name "BLP_11.22.55.44_1" is recoded as a comment under the printer registry key name "Br MF1 Printer".

It is noted that during the install process in S330, as shown in FIG. 10(a), scanner name "Br MF1 LAN" (function-specific device specification data) is stored in association with the system registry key "0047" (device driver specification data) for scanner (system registry for scanner). As shown in FIG. 10(b), printer name "Br MF1 Printer" (function-specific device specification data) is stored in association with the system registry key "Br MF1 Printer" (device driver specification data) for printer (system registry for printer). In S335, port name "BLP_11.22.33.44_1" (input/output interface specification data) is recorded as a printer comment in association with the system registry key "Br MF1 Printer" (device driver specification data) for printer (system registry for printer).

It is noted that after registering in S330 the system registry of FIG. 10(a), for example, the operating system returns in S340 the scanner driver registry key name "TwainClassData" (0047 in FIG. 10(a)) to the installer program of FIG. 4, whereupon the installer program of FIG. 4 reads in S340 settings data under this registry key name and stores the settings data in the target data storage registry.

The data column shown in FIG. 7 is an example of data recorded in S340 in one target data storage registry (installer registry) for a multifunction device that is connected to a local port and that is specified by the key name "\HKEY_LOCAL_MACHINE\Software\Br\Br MFL\BrMF1\2".

Figure 11:
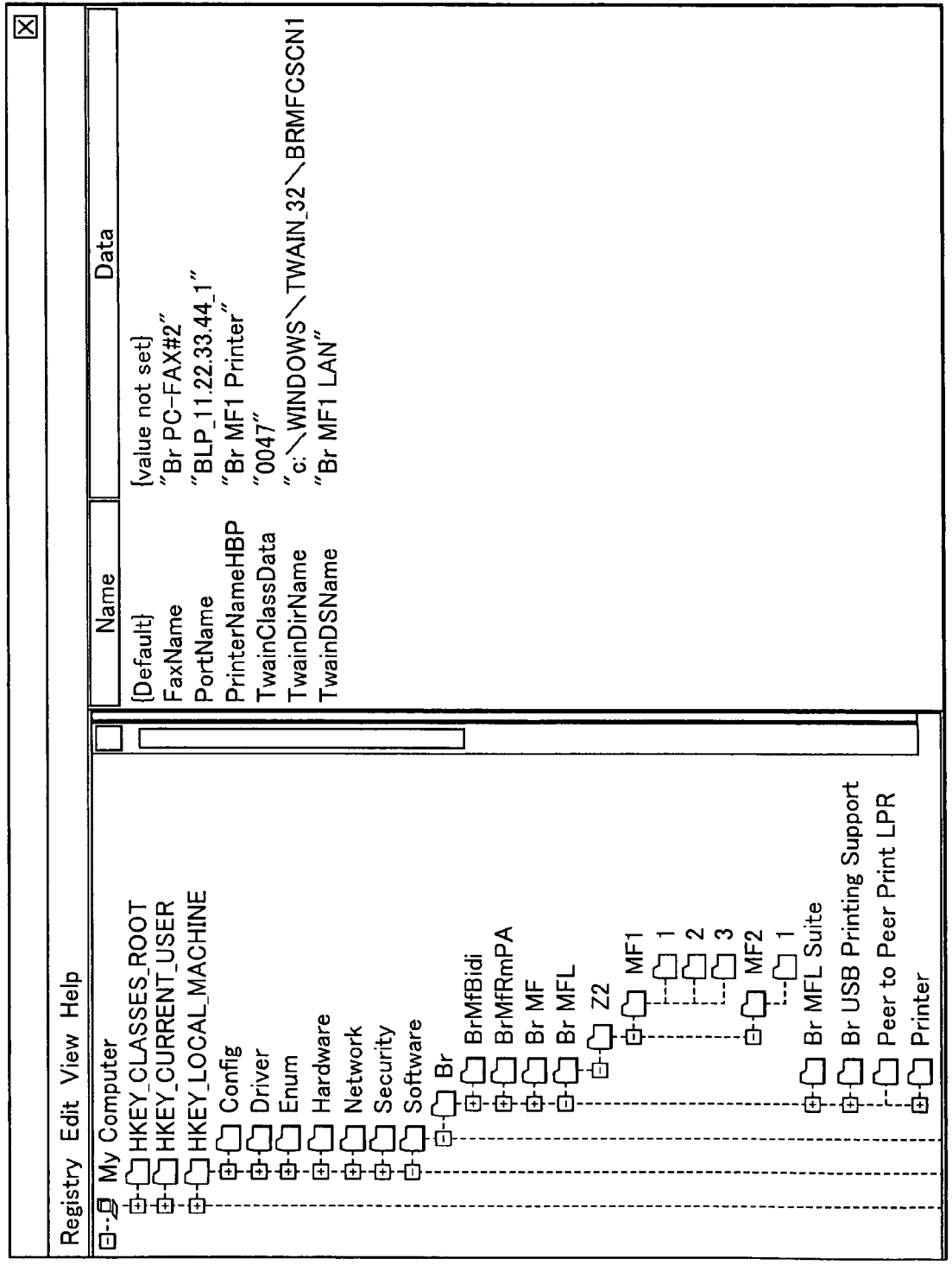
FIG. 11 is an explanatory diagram showing an example registry when the port is network.

The data column shown in FIG. 11 is an example of data recorded in S340 in another target data storage registry (installer registry) for another multifunction device that is connected to a network port and that is specified by the key name "\HKEY_LOCAL_MACHINE\Software\Br\Br MFL\Z2\BrMF1\3".

For example, during the install process of S340, as shown in FIG. 7, the port name "Local" (input/output interface specification data) and the printer name "BrMF1 Printer|Br MF1 USBPrinter" (function-specific device specification data) are stored in association with the key name "\HKEY_LOCAL_MACHINE\Software\Br\Br MFL\Z2\BrMF1\2" in the installer registry for the multifunction device 2 that is connected to the local port of the personal computer 1.

According to another example, during the install process of S340, as shown in FIG. 11, the port name "BLP_11.22.33.44_1" (input/output interface specification data), the printer name "Br MF1 Printer" (function-specific device specification data for printer), the scanner registry key "0047" (scanner driver specification data for scanner), and the scanner name "Br MF1 LAN" (function-specific device specification data for printer) are stored in association with the key name "\HKEY_LOCAL_MACHINE\Software\Br\Br MFL\Z2\BrMF1\3" in the installer registry for the multifunction device 2 that is connected to the network port of the personal computer 1.

With using the registries (the system registries of FIGS. 10(a) and 10(b) and the installer registries of FIGS. 7 and 11, in this example), the driver files, and the icon data shown in FIG. 12, the operating system can control the multifunction device 2 via the device drivers according to commands received from an application program or the like. Accordingly, the user can use each multifunction device 2 of the same model from the personal computer 1 by controlling the multifunction device 2 via a corresponding port according to the scanner driver and scanner interface or according to the printer driver and printer interface.

For example, the operating system executes printer function of some device 2 in a manner described below. The operating system finds the printer name "Br MF1 Printer" (function-specific device specification data for scanner) for the printer function of the subject device 2 in the system registry of FIG. 10(a). The operating system refers to the printer registry key "Br MF1 Printer" (printer driver specification data) that is associated with the printer name "Br MF1 Printer" in the system registry of FIG. 10(b) and to the port name "BLP_11.22.33.44_1" (input/output interface specification data) that is associated with the printer name "Br MF1 Printer" in the system registry of FIG. 10(b) and in the installer registry of FIG. 11. The operating system controls the device 2 with a device driver specified by the printer registry key "Br MF1 Printer" via an input/output interface specified by the port name "BLP_11.22.33.44_1".

The operating system executes scanner function of the same device 2 in a manner described below. The operating system finds the scanner name "Br MF1 LAN" (function-specific device specification data for scanner) for the scanner function of the subject device 2 in the system registry of FIG. 10(a). The operating system refers to the scanner registry key "0047" (scanner driver specification data) that is associated with the scanner name "Br MF1 LAN" in the system registry of FIG. 10(b) and to the port name "BLP_11.22.33.44_1" (input/output interface specification data) that is associated with the scanner name "Br MF1 LAN" in the installer registry of FIG. 11. The operating system controls the device 2 with a device driver specified by the scanner registry key "0047" via an input/output interface specified by the port name "BLP_11.22.33.44_1".

It is noted that as shown in FIG. 9, the inf file further stores therein data of the procedure for the installation process, and serves as an installation procedure file. The inf file stores therein data indicative of whether it is necessary to install in S330 each of a plurality of device drivers stored in the CD-ROM 10 in order to control the device to be installed. The CPU 11 performs the installation process by referring to the procedure in the inf file.

Or otherwise, the steps of the installation process may be incorporated in the install program. By executing the install program, the CPU 11 prompts the user to input his/her instruction as to whether it is necessary to install each of a plurality of device drivers stored in the CD-ROM 10.

If the user no longer needs to use some multifunction device 2 (2a, 2b, or 2c), the user executes the uninstaller stored on the hard disk drive 14. When the CPU 11 executes this uninstaller, an uninstallation process is executed on the personal computer 1. This uninstallation process is described next with reference to FIGS. 13 through 16(b).

Figure 13:
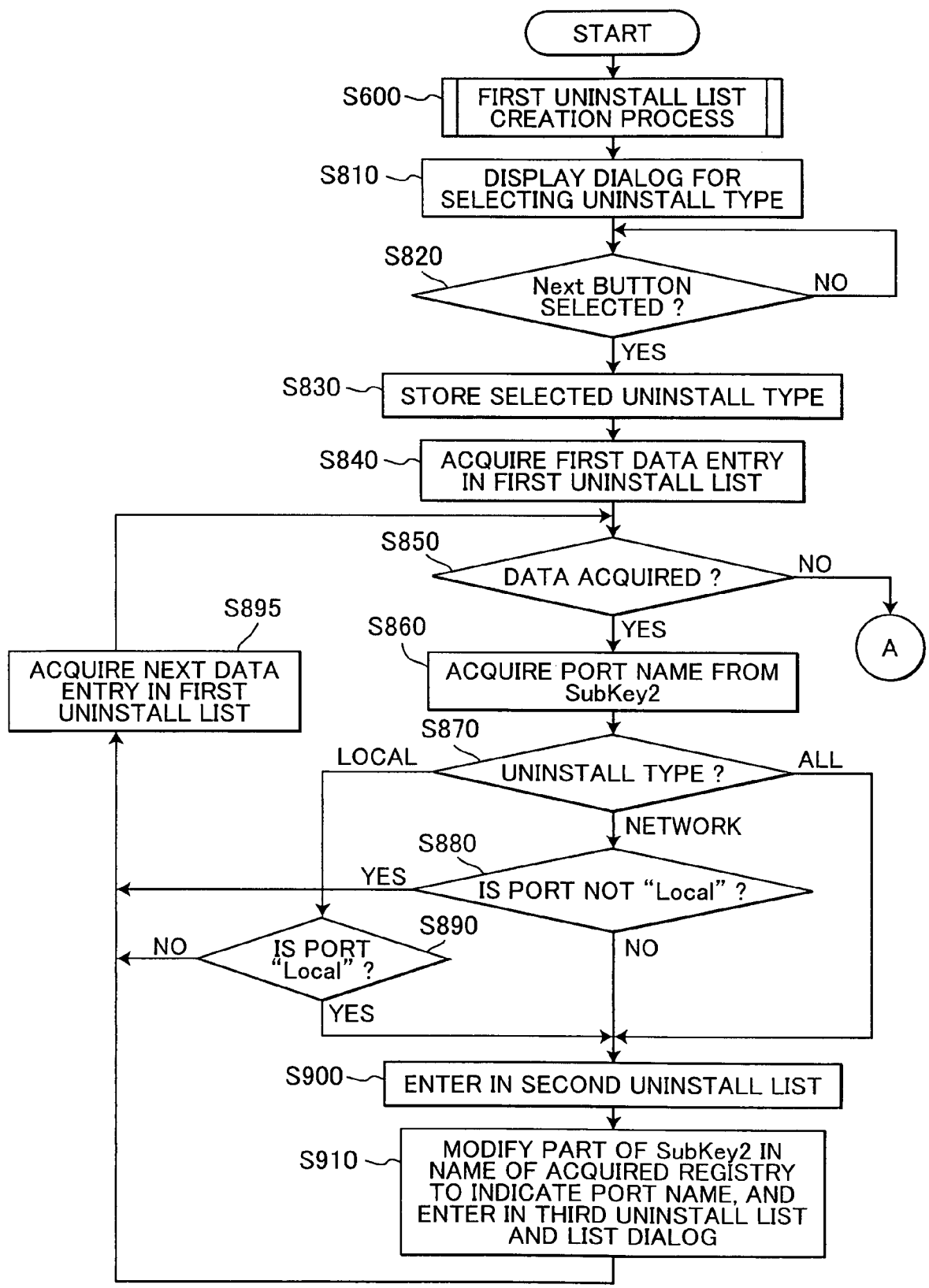
FIG. 13 is a flowchart showing steps in a first part of an uninstallation process.
Figure 14:
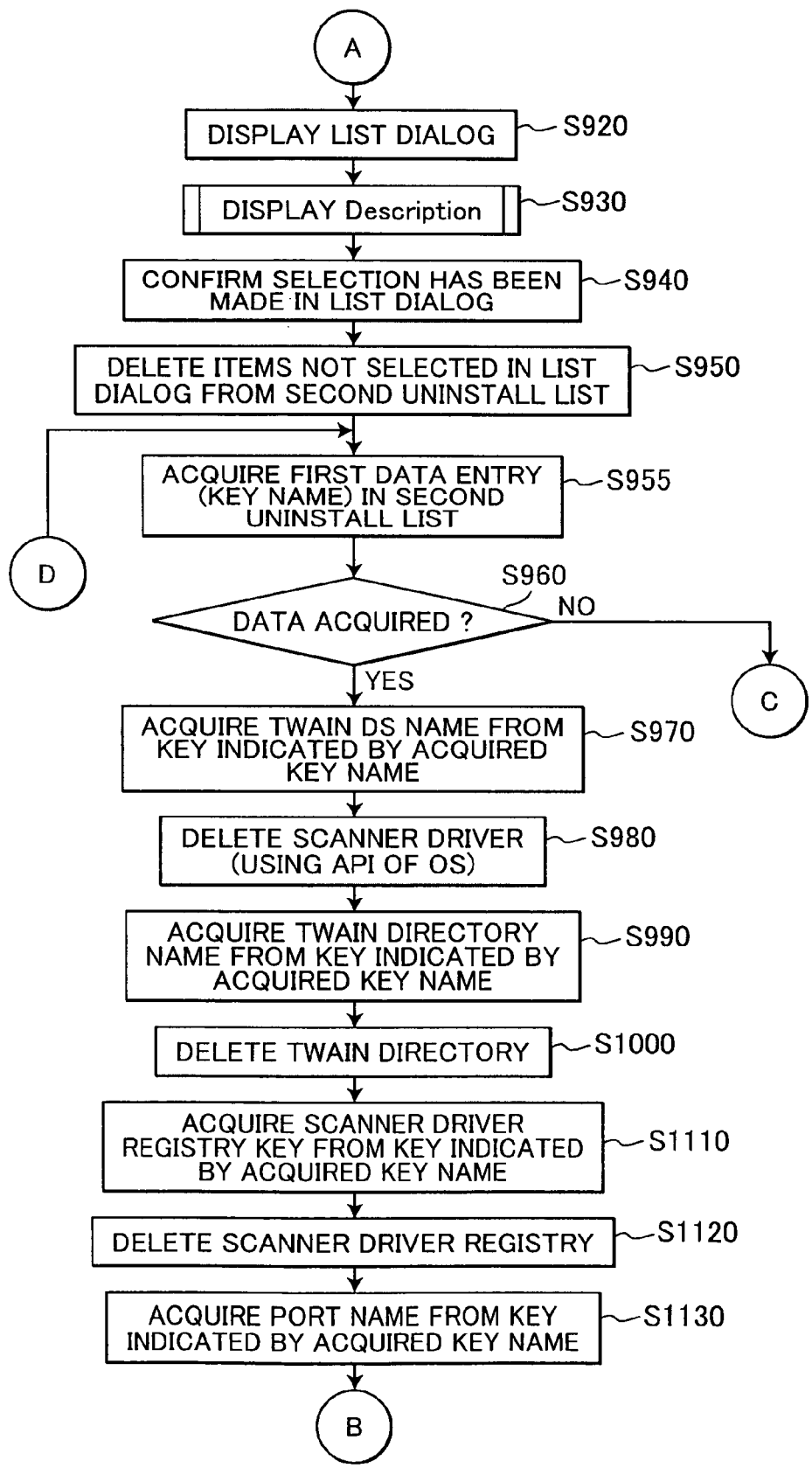
FIG. 14 is a flowchart showing steps in a second part of the uninstallation process of FIG. 13.
Figure 15:
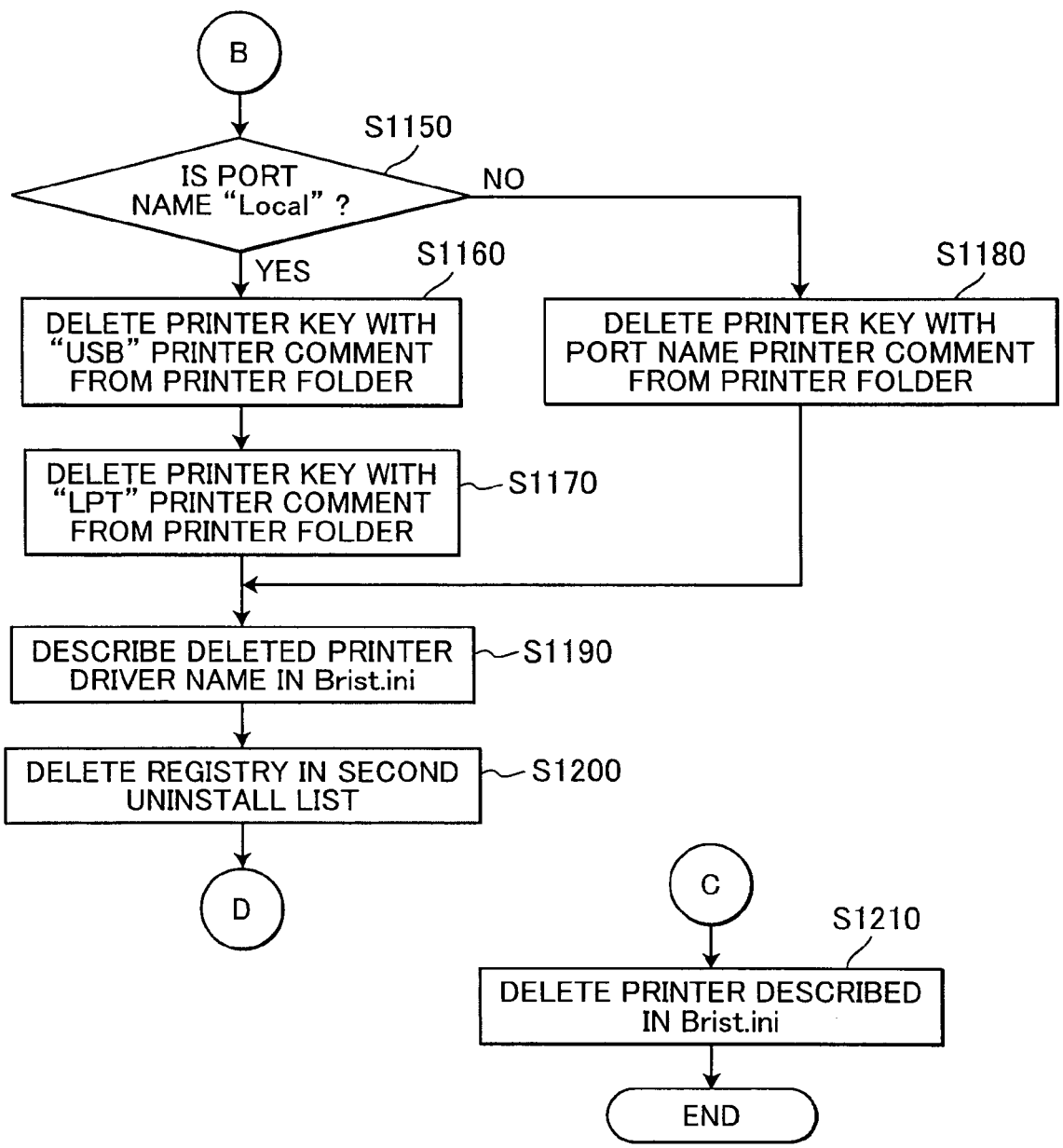
FIG. 15 show a flowchart showing steps in remaining parts of the uninstallation process of FIG. 14.

FIGS. 13-15 are flowcharts showing steps in the uninstallation process. FIG. 16(a) is a flowchart showing steps in a process for creating a first uninstall list described in S600 of FIG. 13. FIG. 16(b) shows examples of a Registry 1, Registry 2, and Registry 3 created in the process of FIG. 16(a).

As shown in FIG. 13, first, in S600, the CPU 11 performs a process to create a first uninstall list (uninstall list 1). This process will be described below in detail with reference to FIGS. 16(a) and 16(b).

As shown in FIG. 16(a), first, in S610, the CPU 11 acquires a list of registries under Registry 1, that is, under "\HKEY_LOCAL_MACHINE\Software\Br\Br MFL\Z2\" in the target data storage registry in the example of FIG. 11 and sets RegList1 to this list. In this example of FIG. 11, a list of registries "MF1 and MF2" is set to RegList1.

In S620 the CPU 11 attempts to acquire the first character array in RegList1 and sets a SubKey1 to the acquired character array.

In S630, the CPU 11 determines whether a character array has been acquired. If a character array has been acquired (S630: YES), then the CPU 11 advances to S640. However, if a character array has not been acquired (S630: NO), then the CPU 11 advances to S810 in FIG. 13.

In S640 the CPU 11 sets Registry 2 to Registry 1+SubKey1.

In S650 the CPU 11 acquires a list of registries under Registry 2 and sets RegList2 to this list.

In S660 the CPU 11 attempts to acquire the top subkey in RegList2 and sets SubKey2 to the acquired character array.

In S670 the CPU 11 determines whether a character array has been acquired in S660.

If a character array has been acquired (S670: YES), then the CPU 11 advances to S690. However, if a character array has not been acquired (S670: NO), then the CPU 11 advances to S680.

In S680 the CPU 11 attempts to acquire the next character array in RegList1. The CPU 11 sets SubKey1 to the acquired character array and returns to S630.

In S690 the CPU 11 sets Registry 3 to Registry 2+SubKey2. In S700 the CPU 11 adds Registry 3 to the first uninstall list (uninstall list 1). In S710 the CPU 11 attempts to acquire the next character array in RegList2, sets SubKey2 to the acquired character array, and returns to S670.

Using the example registry in FIG. 11, the first uninstall list (uninstall list 1) shown in FIG. 17(a) is obtained through the process of FIG. 16(a).

Figure 18:
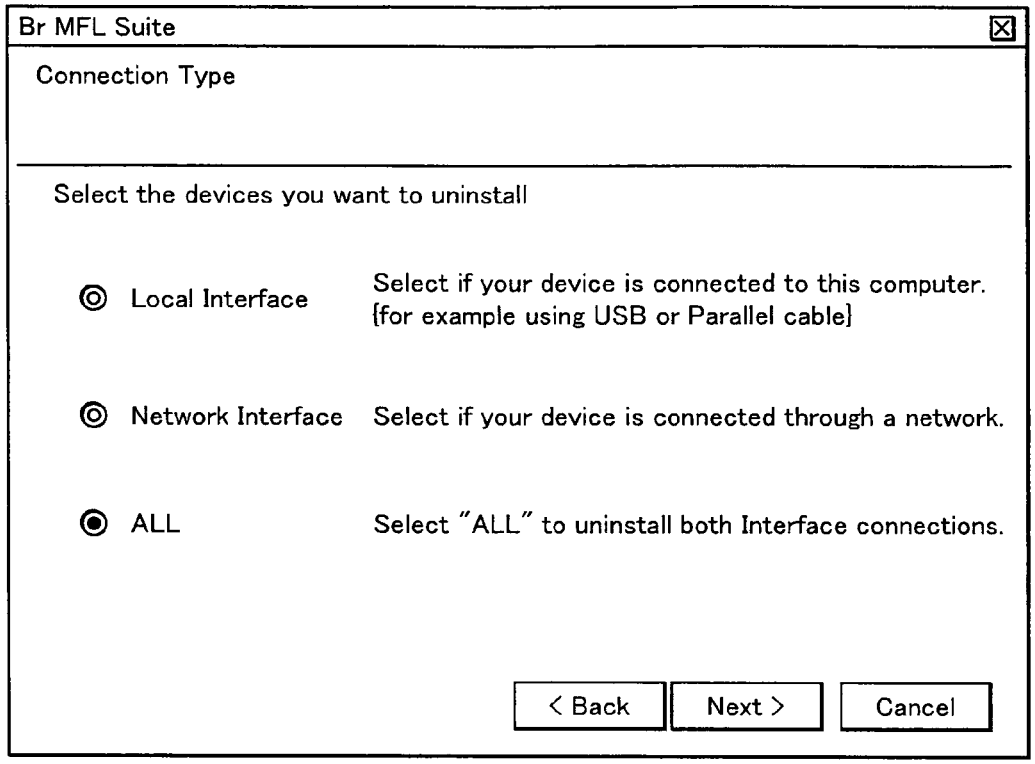
FIG. 18 is an explanatory diagram showing an example of the uninstall type selection dialog box.

Referring back to FIG. 13, next, in S810 the CPU 11 displays a dialog box shown in FIG. 18 for selecting the type of uninstallation desired. This dialog box enables the user to select the connection type of the device to be uninstalled (multifunction device 2). For example, when uninstalling the multifunction device 2a connected to the parallel port 15, the user selects "Local Interface." When uninstalling the multifunction device 2b or 2c on the network 3 connected to the network interface 16, the user selects "Network Interface." To uninstall all of these devices, the user selects "All." After selecting the connection type, the user clicks on the Next button, setting the selected type as the uninstall type.

In S820 the CPU 11 determines whether the Next button has been selected and advances to S830 when the Next button has been selected.

In S830 the CPU 11 stores the selected uninstall type in the RAM 12.

In S840 the CPU 11 attempts to acquire the first data entry in the first uninstall list, and in S850 determines whether the data entry has been acquired. If the data has been acquired (S850: YES), then the CPU 11 advances to S860. However, if the data has not been acquired (S850: NO), then the CPU 11 advances to S920 of FIG. 14.

In S860 the CPU 11 acquires the port name from the SubKey2. In S870 the CPU 11 determines the uninstall type (connection type) based on the uninstall type stored in the RAM 12 in S830. The CPU 11 advances to S890 when the uninstall type is "Local," to S880 when "Network," and to S900 when "All."

In S880 the CPU 11 determines whether the port name acquired in S860 is not "Local." If the port name is not "Local" (S880: No), then the CPU 11 advances to S900, but if "Local" (S880: YES), the CPU 11 advances to S895. In S890 the CPU 11 determines whether the port name acquired in S860 is "Local." If the port name is "Local" (S890: YES), then the CPU 11 advances to S900, but if the port name is not "Local" (S890: NO), then the CPU 11 advances to S895.

In S895 the CPU 11 attempts to acquire the next data entry in the first uninstall list and returns to S850.

In S900 the CPU 11 enters the data in a second uninstall list (uninstall list 2). In S910 the CPU 11 modifies part of the SubKey2 in the second uninstall list to include the port name, enters this SubKey2 in a third uninstall list (uninstall list 3) and the list dialog box, and advances to S895.

As a result of this process, only registry keys of the uninstall type selected in the dialog box of FIG. 18 are stored in the second uninstall list.

In the third uninstall list, the number part of the SubKey2 in the registry key of the second uninstall list is replaced with the port name.

In the case of the registry shown in FIG. 11, for example, values in FIG. 17(a) described above are stored in the first uninstall list. If the user selects "Local" as the uninstall type and if the only entry in the first uninstall list having "Local" as the port name is "2", which is SubKey2 of "\HKEY_LOCAL_MACHINE\Software\Br\Br MFL\Z2\MF1", then the second uninstall list and third uninstall list are created as shown in FIG. 17(b).

Further, when "All" is selected as the uninstall type, the second uninstall list and third uninstall list shown in FIG. 17(c) are created. The elements in each list are configured such that they can be referenced by an index.

Figure 19:
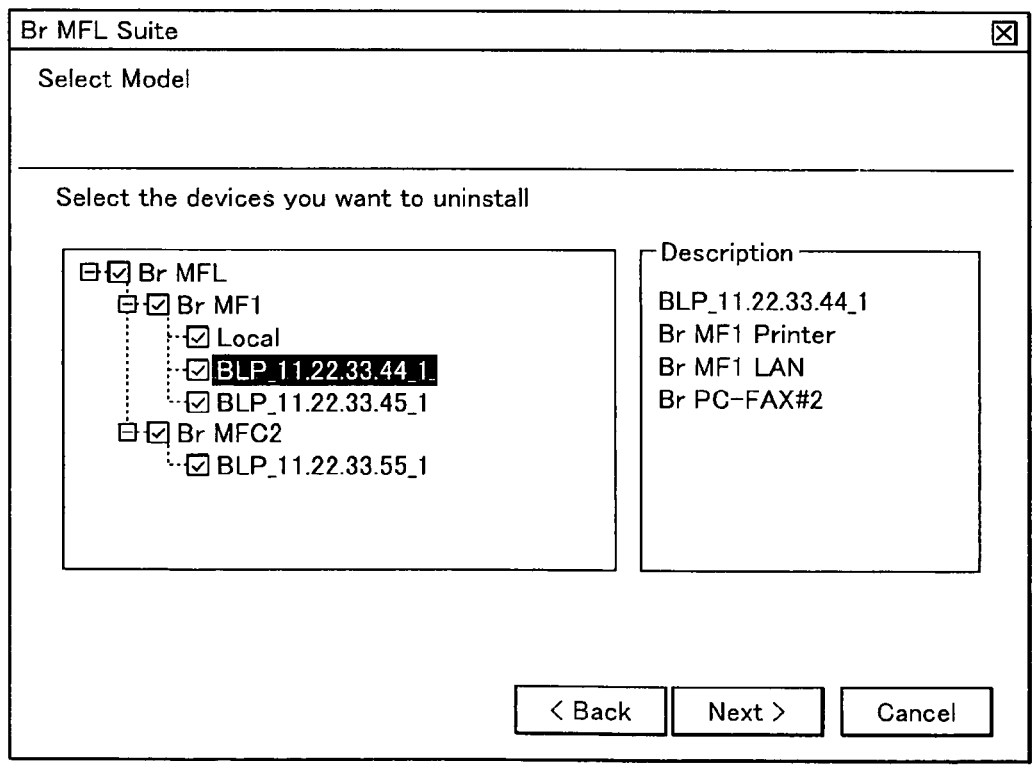
FIG. 19 is an explanatory diagram showing an example of the list dialog box.

As shown in FIG. 14, in S920, the CPU 11 creates and displays a list dialog box, as shown in FIG. 19, based on the third uninstall list. The list dialog box of FIG. 19 shows the example when "All" has been selected in the dialog box of FIG. 18 and therefore the third uninstall list is created in S910 as shown in FIG. 17(c). When "Local Interface" or "Network Interface" has been selected, only the corresponding devices are displayed based on third uninstall list.

In this list dialog box, each node of the tree portion under BrMFL in the registry tree of FIG. 11 is displayed along with checkboxes next to each corresponding node. When a node corresponding to a leaf of the tree is clicked, the checkbox is toggled between a checked state and an unchecked state. When a parent node of the tree is clicked, the checked state of the node is toggled on and off, and all checkboxes under the parent node are also toggled on and off. Checked nodes are treated as being selected.

Of the registry values (content in the Data column in FIG. 11) corresponding to the node selected in the tree (the node toggled in FIG. 19), values for the PortName (input/output interface specification data), PrinterNameHBP (function-specific device specification data for printer), TwainDSName (function-specific device specification data for scanner), and FaxName (function-specific device specification data for fax) are displayed in this order in the Description area. Accordingly, the user can easily specify the target of uninstallation.

Figures 20, 21:
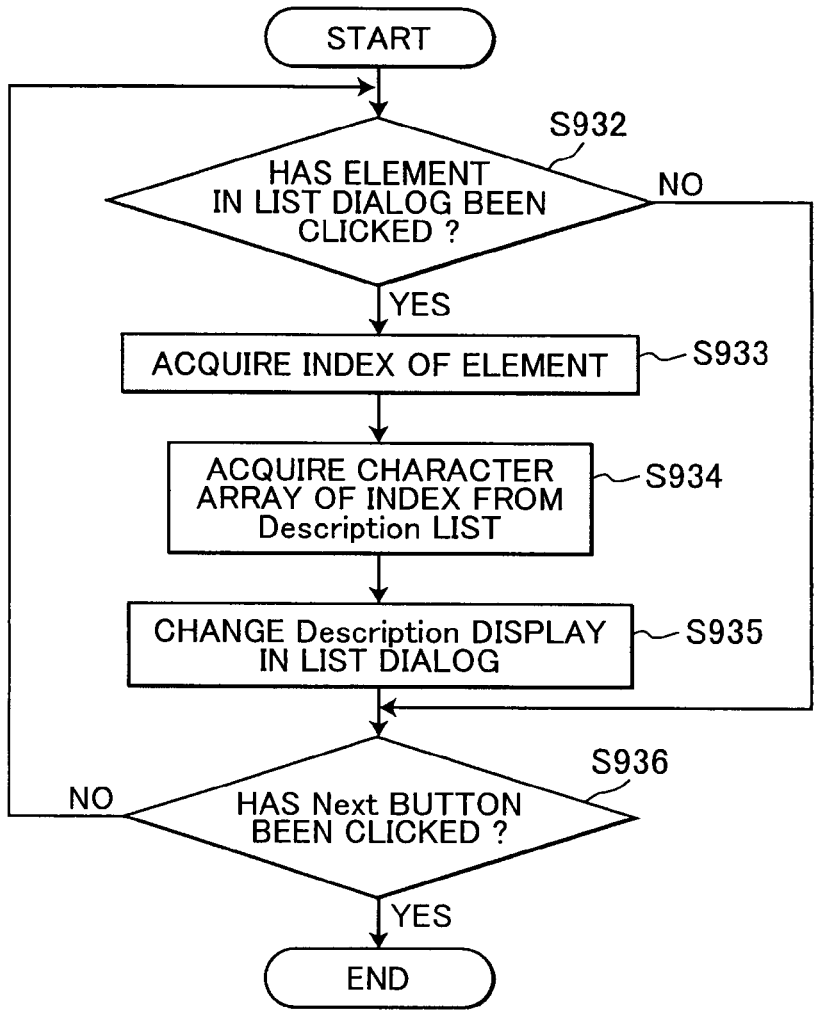
FIG. 20 is a flowchart showing steps in a description display process described in S930 of FIG. 14.
FIG. 21 is an explanatory diagram showing an example of the Brlst.ini file.

More specifically, in S930 the CPU 11 performs a description display process, which is shown in detail in FIG. 20.

As shown in FIG. 20, in S932 the CPU 11 determines whether an element in the list dialog box of FIG. 19 has been clicked.

If an element has been clicked (S932: YES), then the CPU 11 advances to S933. Otherwise (S932: NO), the CPU 11 advances to S936.

In S933 the CPU 11 acquires the index value of the element.

In S934 the CPU 11 acquires description data corresponding to the index value from the target data storage registry (installer registry) shown in FIG. 11, for example.

In S935 the CPU 11 switches the description display of the list dialog box to the description data acquired in S934.

In S936 the CPU 11 determines whether the Next button in the list dialog box has been selected.

If the Next button has been selected (S936: YES), then the CPU 11 ends the process and advances to S940 in FIG. 14. However, if the Next button has not been selected (S936: NO), the CPU 11 returns to S932.

Referring back to FIG. 14, next, in S940 the CPU 11 confirms the existence of selections in the list dialog box of FIG. 19, and in S950 deletes items not selected in the list dialog box from the second uninstall list.

In S955 the CPU 11 attempts to acquire the first data entry in the second uninstall list.

In S960 the CPU 11 determines whether a data entry has been acquired. If a data entry has been acquired (5960: YES), the CPU 11 advances to S970. Otherwise (S960: NO), the CPU 11 advances to S1210 of FIG. 15.

In S970 the CPU 11 acquires the TWAIN DS Name from the registry indicated by the acquired registry key name.

In S980 the CPU 11 uses the API (Application Program Interface) of the operating system to delete the scanner driver based on this TWAIN DS name.

Further, in S990 the CPU 11 acquires the TWAIN directory name from the registry indicated by the acquired registry key name, and in S1000 deletes the TWAIN directory.

Further, in S1110 the CPU 11 acquires the scanner driver registry key from the registry indicated by the acquired registry key name and in S1120 deletes the scanner driver registry. For example, the CPU 11 deletes the tree below "0047" in FIG. 10(a).

In S1130 the CPU 11 acquires the port name from the registry indicated by the acquired registry key name.

For example, if the acquired registry key name indicates the registry shown in FIG. 11, the CPU 11 acquires, during S970-S1130, TWAIN DS Name "Br MF1 LAN", TWAIN directory name "c: \WINDOWS\TWAIN_32\BRMFC-SCN1", scanner registry key name "0047", and port name "BLP_11.22.33.44_1" from the installation registry.

Next, in S1150 of FIG. 15 the CPU 11 determines whether the port name is "Local."

If the port name is "Local" (S1150: YES), the CPU 11 advances to S1160 and deletes a printer key, which has been recorded with a printer comment of "USB" in S335, from the printer folder.

In S1170 the CPU 11 deletes a printer key, which has been recorded with a printer comment of "LPT" in S335, from the printer folder.

However, if the port name is not "Local" (S1150: NO), then in S1180 the CPU 11 deletes a printer key, which has been recorded in S335 with a printer comment the same as the port name acquired in S1130, from the printer folder.

In this way, in S1160, S1170, or S1180, the CPU 11 deletes the printer driver registry. For example, the CPU 11 deletes in S1180 the tree below "Br MF1 Printer" in FIG. 10(b) because the printer key "Br MF1 Printer" is recorded with a printer comment of the port name "BLP_11.22.33.44_1".

In S1190 the CPU 11 recites a description of the deleted printer driver name in the Brlst.ini file. An example description is shown in FIG. 21.

In S1200 the CPU 11 deletes the subject registry from second uninstall list and returns to S955.

If data entry has not been acquired in S960 (S960: NO), then in S1210 the CPU 11 deletes the description of the printer in the Brlst.ini file.

With the uninstall system according to the preferred embodiment described above, the installer registries (target data storage registry) shown in FIGS. 7 and 11 are provided separately from the system registries shown in FIGS. 10(a) and 10(b). In the installer registry indicated by a registry key for each multifunction device 2, data identifying all the device drivers (scanner driver, printer driver, and fax driver) that are installed for the multifunction device 2 are registered in association with one another. Accordingly, the uninstall system can easily identify all the device drivers installed for the subject multifunction device 2 at one time, and can easily cancel the recordation of all the installed device drivers from the operating system.

Further, the user can uninstall a plurality of device drivers for one or more specific device 2 at one time by designating the one or more specific device 2. Accordingly, the uninstall system of the present embodiment is convenient and is not troublesome for the user to operate.

Hence, even though both the printer driver and the scanner driver are required for controlling some device 2 to execute the printer function and the scanner function, the user can uninstall the printer driver and the scanner driver for that device all at once simply by indicating the specific device 2. Accordingly, the uninstall system of the present embodiment is convenient to the user.

The port name (input/output interface specification data) is recorded in the installer registry as shown in FIGS. 7 and 11. Accordingly, the list dialog box of FIG. 19 is prepared based on the installer registry to show the port names, to which all the devices are connected, thereby enabling the user to identify all the devices installed. It is noted, however, that device-identifying data other than the port name may be stored in the installer registry in place of the port name if the device-identifying data can enable the user to identify the corresponding device.

In S930, the printer name and the scanner name (specific-function device specification data) that are stored in the installer registry in association with the user's selected device are displayed as shown in FIG. 19. The user can easily learn which device driver is targeted for uninstallation.

As shown in FIG. 11, the port name is stored in association with the key name "\HKEY_LOCAL_MACHINE\Software\Br\Br MFL\Z2\BrMF1\3", which indicates the corresponding multifunction device 2 and which includes data "BrMF1" indicative of the model of the subject multifunction device 2. In this way, the port name is stored in association with the key name for each device, and the key name for each device includes model specification data indicative of the model name of the subject multifunction device. Accordingly, in S920, the list dialog box of FIG. 19 is created to display model names "Br MF1" and "Br MFC2" of all the devices 2 that are connected to the personal computer 1. Port names "Local", "BLP_11.22.33.44_1", and "BLP 11.22.33.45_1" that are stored in the installer registries in association with all the key names that include the model name "Br MF1" are displayed in association with the subject model name. Similarly, port name "BLP 11.22.33.55_1" that is stored in the installer registry in association with all the key name that includes the model name "Br MFC2" is displayed in association with the subject model name. The user is urged to select at least one model as a target of uninstallation. When at least one model is selected in S940, all the device(s), that is identified by all the port names that are stored in association with the user's selected model, is set in S950 as the user's desired target device for uninstallation. Accordingly, it is possible to uninstall all the device drivers according to the user's selected model.

Further, if the user wishes to uninstall all the device drivers for a specific model, for example, the user may do so simply by designating the model. The list dialog box of FIG. 19 displays, in association with each model, port names that are stored in association with all the devices of the subject model in the installer registry. Viewing the list dialog box, the user can know the model of each device. The user can easily select specific devices or specific models as targets for uninstallation.

While the invention has been described in detail with reference to the specific embodiment thereof, it would be apparent to those skilled in the art that many modifications and variations may be made therein without departing from the spirit of the invention, the scope of which is defined by the attached claims.

For example, the target device of uninstallation may be automatically detected by the personal computer 1 by detecting the connection status of the devices 2, for example, to the personal computer 1. In such a case, S600 through 5950 may be omitted from the uninstall process of FIGS. 13-15.

In the above description, the install program and the uninstall program are originally stored in the CD-ROM 10 and are read by the personal computer 1 and are loaded into the personal computer 1. However, the install program and the uninstall program may be originally stored in another storage medium that can be read by a computer, such as a flexible disk, an optical disc (DVD-ROM, or the like), hard disk, ROM, or RAM, and loaded and executed on the computer when required, or may be loaded and executed on the computer via a network.

In the above description, each multifunction device 2 has at least one function among a printer function, an image scanner function, and a fax communication function. The operating system can direct each device via a corresponding input/output interface to process image data by using its corresponding function. It is unnecessary for each device 2 to perform image processing function, such as printer function, image scanner function, or fax communication function. It is sufficient that each device 2 requires installation of one or more device drivers to execute one or more functions. The operating system of the personal computer 1 controls each device 2 with a device driver for each function to implement the subject function possessed by the device.

The step of S335 may be executed prior to or simultaneously with the step of S330.

What is claimed is:

1. An uninstall device, comprising:
    a processor means for executing processes; and
    a memory means;
    the processor means including:
    installing means for executing an installation process for recording, in a device registration area managed by an operating system, function-specific device specification data, which is data to enable an operating system to identify a function of a device, in association with device driver specification data, which is data for specifying a device driver as a program for controlling the device to execute the function, the device registration area being defined in the memory means;
    additional installing means for performing an additional installation process for recording at least one of the function-specific device specification data and the device driver specification data in an additional registration area in association with device specification data, which is data indicating the device, the additional registration area being defined in the memory means;

uninstall request receiving means for performing a process to receive an uninstall request from a user targeting the device; and uninstalling means for performing, when an uninstall request for the device is received from the user by the uninstall request receiving means, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

2. An uninstall device according to claim 1, wherein the installing means executes the installation process for recording, in the device registration area, the function-specific device specification data further in association with input/output interface specification data, which is data for specifying an input/output interface used for performing communications to control the device; the installing means enabling the operating system to find the function-specific device specification data recorded in the device registration area and to execute the function possessed by the device by controlling the device with the device driver specified by the device driver specification data that is associated with the function-specific device specification data via the input/output interface that is specified by the input/output interface specification data that is associated with the function-specific device specification data;

wherein the uninstalling means performs the uninstallation process by further removing, from the device registration area, the input/output interface specification data that is associated with the function-specific device specification data for the device, thereby preventing the operating system from controlling the device to execute the function;

wherein the uninstalling means executes the uninstallation process based on the function-specific device specification data by removing entries of the input/output interface specification data and the device driver specification data, which are stored in the device registration area in association with the function-specific device specification data that is stored in the additional registration area in association with the device specification data for the device targeted for uninstallation; and wherein the uninstalling means executes the uninstallation process based on the device driver specification data by removing entries of the device driver specification data and the input/output interface specification data that are stored in the device registration area in association with the device driver specification data that is stored in the additional registration area in association with the device specification data for the device targeted for uninstallation.

3. An uninstall device according to claim 1, further comprising installation procedure storing means for storing installation procedure data including an indication of whether the device driver is to be installed for the function possessed by the device;

wherein the installing means determines whether a device driver is to be installed for enabling the operating system to control the device to execute the function, and installs the device driver when necessary according to the installation procedure stored in the installation procedure storing means.

4. An uninstall device according to claim 1, wherein the device includes a plurality of devices, wherein the uninstall request receiving means receives an uninstall request from the user by prompting the user to select at least one device as the target for uninstallation; and wherein the uninstalling means performs the uninstallation process for the device selected by the user as the target of uninstallation.

5. An uninstall device according to claim 4, wherein when the user selects two or more devices as the target of uninstallation, the uninstalling means performs the uninstallation process for all the user's selected two or more devices.

6. An uninstall device according to claim 4, further comprising a display, wherein the additional installing means performs another additional installation process to record device identification data, which is data enabling the user to identify each device, in the additional registration area in association with the device specification data for the each device; and wherein the uninstall request receiving means performs a process to control the display to show the device identification data stored in the additional registration area and to prompt the user to select at least one device as the target of uninstallation based on the displayed device identification data.

7. An uninstall device according to claim 6, wherein the device identification data for each device includes the input/output interface specification data for the device.

8. An uninstall device according to claim 7, wherein the uninstall request receiving means reads the function-specific device specification data that corresponds to the selected device from the additional registration area and controls the display to show the device driver specification data.

9. An uninstall device according to claim 4, further comprising a display, wherein the additional installing means performs another additional installation process to record device identification data, which is data enabling the user to identify each device, and model specification data, which is data specifying the model of the each device, in the additional registration area in association with each other; and the uninstall request receiving means performs a process to control the display to show the model specification data stored in the additional registration area and to prompt the user to select model specification data as the target of uninstallation, and sets, as a device targeted for uninstallation, all the device that is identified by device identification data that is stored in the additional registration area in association with the model specification data selected by the user as the target for uninstallation.

10. An uninstall device according to claim 9, wherein the uninstall request receiving means controls the display to show, in association with the model specification data, the device identification data that are stored in the additional registration area in association with the model specification data.

11. An uninstall device according to claim 1, wherein the functions of the device include at least one of a printer function, an image scanner function, and a fax communication function.

12. An uninstall device according to claim 1, wherein the device is a multifunction device having two or more different functions.

13. An uninstall device, comprising:
an operating system;
a memory;
an installing portion that executes an installation process for recording, in a device registration area managed by the operating system, function-specific device specification data, which is data to enable an operating system to identify a function of a device, in association with device driver specification data, which is data for specifying a device driver as a program for controlling the device to execute the function;
an additional installing portion that performs an additional installation process for recording at least one of the function-specific device specification data and the device driver specification data in an additional registration area in association with device specification data, which is data indicating the device;
an uninstall request receiving portion that performs a process to receive an uninstall request from a user targeting the device; and
an uninstalling portion that performs, when an uninstall request for the device is received from the user by the uninstall request receiving portion, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

14. An uninstall device according to claim 13,
wherein the installing portion executes the installation process for recording, in the device registration area, the function-specific device specification data further in association with input/output interface specification data, which is data for specifying an input/output interface used for performing communications to control the device; the installing portion enabling the operating system to find the function-specific device specification data recorded in the device registration area and to execute the function possessed by the device by controlling the device with the device driver specified by the device driver specification data that is associated with the function-specific device specification data via the input/output interface that is specified by the input/output interface specification data that is associated with the function-specific device specification data;
wherein the uninstalling portion performs the uninstallation process by further removing, from the device registration area, the input/output interface specification data that is associated with the function-specific device specification data for the device, thereby preventing the operating system from controlling the device to execute the function;
wherein the uninstalling portion executes the uninstallation process based on the function-specific device specification data by removing entries of the input/output interface specification data and the device driver specification data, which are stored in the device registration area in association with the function-specific device specification data that is stored in the additional registration area in association with the device specification data for the device targeted for uninstallation; and
wherein the uninstalling portion executes the uninstallation process based on the device driver specification data by removing entries of the device driver specification data and the input/output interface specification data that are stored in the device registration area in association with the device driver specification data that is stored in the additional registration area in association with the device specification data for the device targeted for uninstallation.

15. The uninstall device according to claim 13, wherein the device is a multifunction device having two or more different functions.

16. An uninstall method, comprising:
executing an installation process for recording, in a device registration area managed by an operating system, function-specific device specification data, which is data to enable an operating system to identify a function of a device, in association with device driver specification data, which is data for specifying a device driver as a program for controlling the device to execute the function;
performing an additional installation process for recording at least one of the function-specific device specification data and the device driver specification data in an additional registration area in association with device specification data, which is data indicating the device;
performing a process to receive an uninstall request from a user targeting the device; and
performing, when an uninstall request for the device is received from the user, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

17. An uninstall method according to claim 16,
wherein the installing step executes the installation process for recording, in the device registration area, the function-specific device specification data further in association with input/output interface specification data, which is data for specifying an input/output interface used for performing communications to control the device; the installing step enabling the operating system to find the function-specific device specification data recorded in the device registration area and to execute the function possessed by the device by controlling the device with the device driver specified by the device driver specification data that is associated with the function-specific device specification data via the input/output interface that is specified by the input/output interface specification data that is associated with the function-specific device specification data;
wherein the uninstalling step performs the uninstallation process by further removing, from the device registration area, the input/output interface specification data that is associated with the function-specific device specification data for the device, thereby preventing the operating system from controlling the device to execute the function;
wherein the uninstalling step executes the uninstallation process based on the function-specific device specification data by removing entries of the input/output interface specification data and the device driver specification data, which are stored in the device registration area in association with the function-specific device specification data that is stored in the additional registration area in association with the device specification data for the device targeted for uninstallation; and wherein the uninstalling step executes the uninstallation process based on the device driver specification data by removing entries of the device driver specification data and the input/output interface specification data that are stored in the device registration area in association with the device driver specification data that is stored in the additional registration area in association with the device specification data for the device targeted for uninstallation.

18. The uninstall method according to claim 16, wherein the device is a multifunction device having two or more different functions.

19. An uninstall system, comprising:
a processor means for executing processes; and
a memory means;
the processor means includes:
installing means for registering, in a device registration area managed by an operating system, data of a group of device drivers for a device, the group of device drivers including a plurality of device drivers to be used by the operating system to control the device to perform a plurality of functions, the device registration area being defined in the memory means;
uninstall request receiving means for receiving a user's instruction to uninstall the group of device drivers for the device; and
uninstalling means for canceling, upon receipt of the instruction, registration of the group of device drivers from the device registration area,
wherein the installing means records relationship between the group of device drivers and the device in an additional storage area, and wherein the uninstalling means cancels the plurality of device drivers in the group of device drivers by referring to the relationship between the group of device drivers and the device, the additional storage area being defined in the memory means.

20. The uninstall system according to claim 19, wherein the device is a multifunction device having two or more different functions.

21. An uninstall system, comprising:
a memory; and
a controller
that registers, in a device registration area that is prepared in the memory and that is managed by an operating system, data of a group of device drivers for a device, the group of device drivers including a plurality of device drivers to be used by the operating system to control the device to perform a plurality of functions, and
that receives a user's instruction to uninstall the group of device drivers for the device, and that cancels, upon receipt of the instruction, registration of the group of device drivers from the device registration area,
wherein the controller records relationship between the group of device drivers and the device in an additional storage area prepared in the memory, and wherein the controller cancels the plurality of device drivers in the group of device drivers by referring to the relationship between the group of device drivers and the device.

22. The uninstall system according to claim 21, wherein the device is a multifunction device having two or more different functions.

23. A storage medium storing an uninstall program readable by a computer, the uninstall program comprising the programs of:
executing an installation process for recording, in a device registration area managed by an operating system, function-specific device specification data, which is data to enable an operating system to identify a function of a device, in association with device driver specification data, which is data for specifying a device driver as a program for controlling the device to execute the function;
performing an additional installation process for recording at least one of the function-specific device specification data and the device driver specification data in an additional registration area in association with device specification data, which is data indicating the device;
performing a process to receive an uninstall request from a user targeting the device; and
performing, when an uninstall request for the device is received from the user, an uninstallation process for removing, from the device registration area, the device driver specification data that is associated with the function-specific device specification data for the device targeted for uninstallation, by using the at least one of the function-specific device specification data and the device driver specification data that is stored in the additional registration area in association with the device specification data indicating the device targeted for uninstallation.

24. A storage medium according to claim 23,
wherein the installing program executes the installation process for recording, in the device registration area, the function-specific device specification data further in association with input/output interface specification data, which is data for specifying an input/output interface used for performing communications to control the device; the installing program enabling the operating system to find the function-specific device specification data recorded in the device registration area and to execute the function possessed by the device by controlling the device with the device driver specified by the device driver specification data that is associated with the function-specific device specification data via the input/output interface that is specified by the input/output interface specification data that is associated with the function-specific device specification data;
wherein the uninstalling program performs the uninstallation process by further removing, from the device registration area, the input/output interface specification data that is associated with the function-specific device specification data for the device, thereby preventing the operating system from controlling the device to execute the function;
wherein the uninstalling program executes the uninstallation process based on the function-specific device specification data by removing entries of the input/output interface specification data and the device driver specification data, which are stored in the device registration area in association with the function-specific device specification data that is stored in the additional registration area in association with the device specification data for the device targeted for uninstallation; and wherein the uninstalling program executes the uninstallation process based on the device driver specification data by removing entries of the device driver specification data and the input/output interface specification data that are stored in the device registration area in association with the device driver specification data that is stored in the additional registration area in association with the device specification data for the device targeted for uninstallation.

25. The storage medium according to claim 23, wherein the device is a multifunction device having two or more different functions.

* * * * *

UNITED STATES PATENT AND TRADEMARK OFFICE
CERTIFICATE OF CORRECTION

PATENT NO. : 7,665,084 B2  
APPLICATION NO. : 10/808338  
DATED : February 16, 2010  
INVENTOR(S) : Suzuki et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1695 days.

Signed and Sealed this

Seventh Day of December, 2010

David J. Kappos  
*Director of the United States Patent and Trademark Office*